(12) United States Patent
Wiesemann et al.

(10) Patent No.: US 8,884,773 B2
(45) Date of Patent: Nov. 11, 2014

(54) SHORE POWER CORD SET

(75) Inventors: David L. Wiesemann, Pewaukee, WI (US); Timothy J. Kent, Elm Grove, WI (US); Jason W. Anderson, Auckland (NZ); Vitaly Kapelevich, Auckland (NZ); Patrick J. Radle, Mequon, WI (US); Christopher L. Peterson, Chippewa Falls, WI (US); David J. Prince, Eau Claire, WI (US); Scott A. Olson, Chippewa Falls, WI (US)

(73) Assignee: Power Products, LLC, Menomonee Falls, WI (US)

( * ) Notice: Subject to any disclaimer, the term of this patent is extended or adjusted under 35 U.S.C. 154(b) by 394 days.

(21) Appl. No.: 13/228,242

(22) Filed: Sep. 8, 2011

(65) Prior Publication Data
US 2012/0062385 A1    Mar. 15, 2012

Related U.S. Application Data

(60) Provisional application No. 61/381,498, filed on Sep. 10, 2010, provisional application No. 61/474,510, filed on Apr. 12, 2011.

(51) Int. Cl.
*G08B 21/00* (2006.01)
*H01R 31/06* (2006.01)
(Continued)

(52) U.S. Cl.
CPC ........... *H01R 31/065* (2013.01); *B60L 2230/12* (2013.01); *Y02T 10/7005* (2013.01); *B60L 11/1818* (2013.01); *H01R 13/5202* (2013.01); *Y02T 90/14* (2013.01); *B60L 2270/34* (2013.01); *H01R 24/005* (2013.01); *B60L 2270/32* (2013.01); *H01R 13/622* (2013.01); *H01R 13/6395* (2013.01); *B60L 3/0069* (2013.01); *H01R 13/6273* (2013.01); *Y02T 90/121* (2013.01); *Y02T 10/7088* (2013.01); *H01R 13/625* (2013.01); *H01R 13/7175* (2013.01)
USPC ............ 340/635; 340/656; 439/345; 320/109

(58) Field of Classification Search
USPC ........... 340/635, 650–657; 439/345; 324/508, 324/503, 504; 307/9.1; 320/107, 109
See application file for complete search history.

(56) References Cited

U.S. PATENT DOCUMENTS 3,986,765 A * 10/1976 Shaffer et al. ................. 439/314
4,118,690 A * 10/1978 Paynton ........................ 340/656
(Continued)

FOREIGN PATENT DOCUMENTS

DE    10 2009 034 886 A1    2/2011
EP         0 622 265 A2    11/1994
(Continued)

OTHER PUBLICATIONS

Daniel Corrales, authorized officer of the European Patent Office; PCT International Search Report and Written Opinion for corresponding Int'l Application No. PCT/US2012/022643; dated Jun. 28, 2012; 15 pages.
(Continued)

*Primary Examiner* — Eric M Blount
(74) *Attorney, Agent, or Firm* — Michael Best & Friedrich LLP

(57) ABSTRACT

A shore power cord includes a power supply connector electrically connected to a vehicle connector. In some cases, the vehicle connector includes features to selectively secure the vehicle connector to a vehicle power receptacle inlet. In some cases, the shore power cord includes a test module that evaluates the condition of the cord set and a power supply when the cord set is connected to the power supply.

15 Claims, 34 Drawing Sheets

(51) Int. Cl.
  *B60L 11/18* (2006.01)
  *H01R 13/622* (2006.01)
  *B60L 3/00* (2006.01)
  *H01R 13/625* (2006.01)
  *H01R 13/52* (2006.01)
  *H01R 24/00* (2011.01)
  *H01R 13/639* (2006.01)
  *H01R 13/627* (2006.01)
  *H01R 13/717* (2006.01)

(56) References Cited

U.S. PATENT DOCUMENTS

| | | | | |
|---|---|---|---|---|
| 4,255,007 | A | | 3/1981 | Michaels et al. |
| 5,214,369 | A | * | 5/1993 | McCrea ........................ 320/143 |
| 5,369,352 | A | * | 11/1994 | Toepfer et al. ................ 320/110 |
| D413,100 | S | | 8/1999 | Nakazawa |
| D415,469 | S | | 10/1999 | Lee |
| 6,205,201 | B1 | | 3/2001 | Prince |
| 6,212,054 | B1 | | 4/2001 | Chan |
| 6,227,892 | B1 | | 5/2001 | Kera |
| 6,290,533 | B1 | | 9/2001 | Major |
| 6,398,579 | B1 | | 6/2002 | Banas et al. |
| 6,592,393 | B1 | | 7/2003 | Gentle |
| D512,965 | S | | 12/2005 | Dobler |
| 7,196,885 | B2 | | 3/2007 | Pierce et al. |
| D587,653 | S | | 3/2009 | Barnes, Jr. et al. |
| 7,817,055 | B1 | * | 10/2010 | Scanlon ........................ 340/657 |
| 7,994,795 | B2 | * | 8/2011 | Drake et al. .................. 324/508 |
| D646,638 | S | * | 10/2011 | Peterson et al. ............. D13/133 |
| 8,213,204 | B2 | * | 7/2012 | Lanni ............................ 363/142 |
| 2009/0160427 | A1 | * | 6/2009 | Drake et al. .................... 324/72 |
| 2009/0316321 | A1 | * | 12/2009 | Ouwerkerk .................... 361/106 |
| 2010/0174667 | A1 | * | 7/2010 | Vitale et al. ................... 705/412 |
| 2011/0172839 | A1 | * | 7/2011 | Brown et al. ................. 700/292 |
| 2011/0175569 | A1 | * | 7/2011 | Austin .......................... 320/109 |

FOREIGN PATENT DOCUMENTS

| | | |
|---|---|---|
| JP | 06338227 A | 12/1994 |
| JP | 2010-110055 A | 5/2010 |
| WO | 2010/049773 A2 | 5/2010 |

OTHER PUBLICATIONS

Pass & Seymour; Pass & Seymour/Legrand NEMA Configuration Table; copyright 2006; 1 page.
Marinco Electrical Group; ParkPower® Quality RV Electrical Products; product literature; copyright 2008; 4 pages.
Wholesale Marine; Shorepower Cordsets; pages from www.wholesalemarine.com; admitted prior art; 2 pages, Sep. 2010.
Wholesale Marine; Shorepower Cordsets; pages from www.wholesalemarine.com; admitted prior art; 6 pages, Sep. 2010.
Hubbell; HBL61CM05 Shore Power Cable Set 2 Pole; pages from www.google.com/products; admitted prior art; 2 pages, Sep. 2010.
Smartplug Systems, LLC; brochure from www.smartplug.com; Seattle, WA; admitted prior art; 2 pages, Sep. 2010.
Ratio Electric; Shore Power Connections; brochure page from www.shore-power.info; Nijkerk, The Netherlands; admitted prior art; 1 page, Sep. 2010.

* cited by examiner

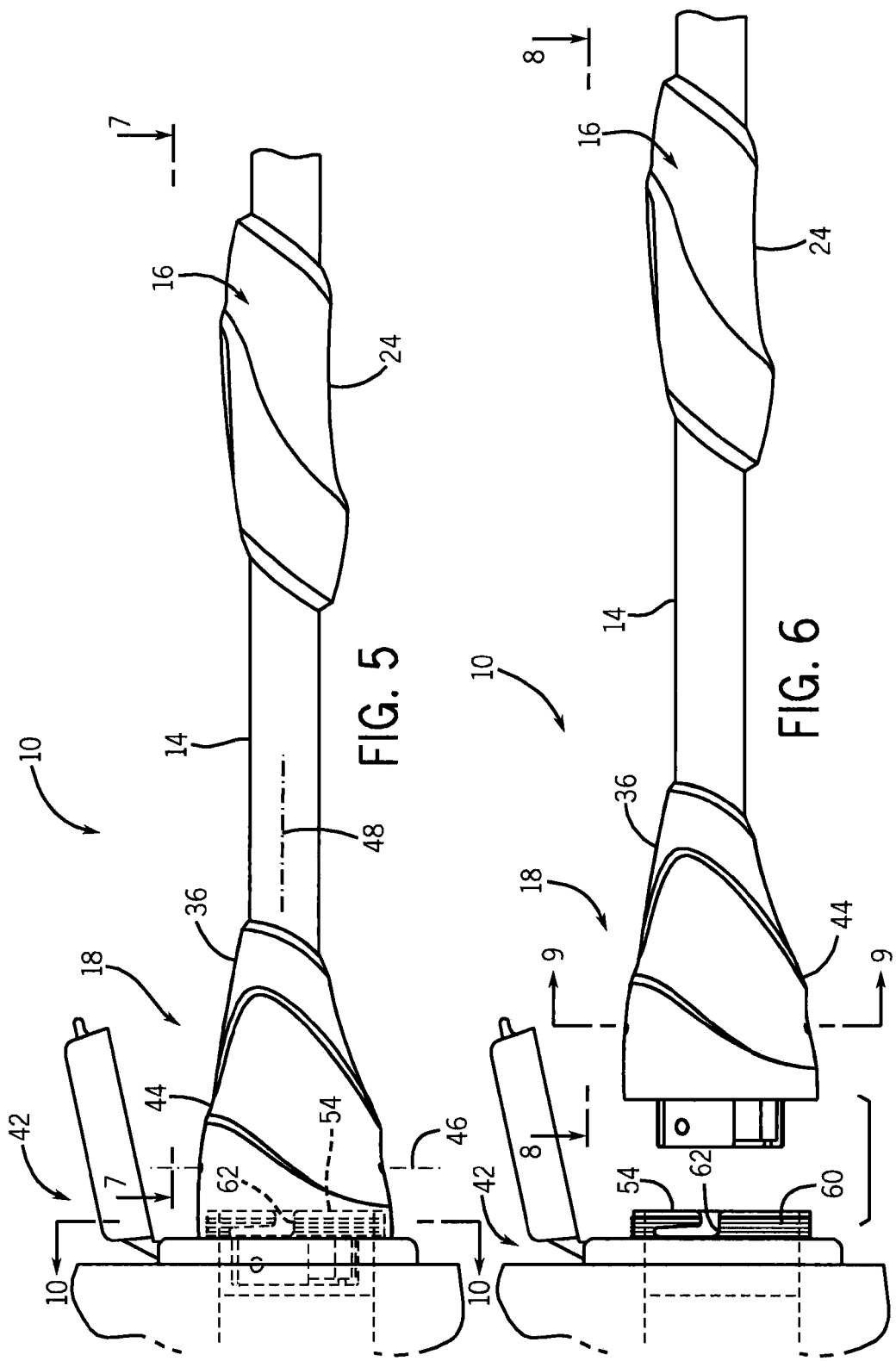

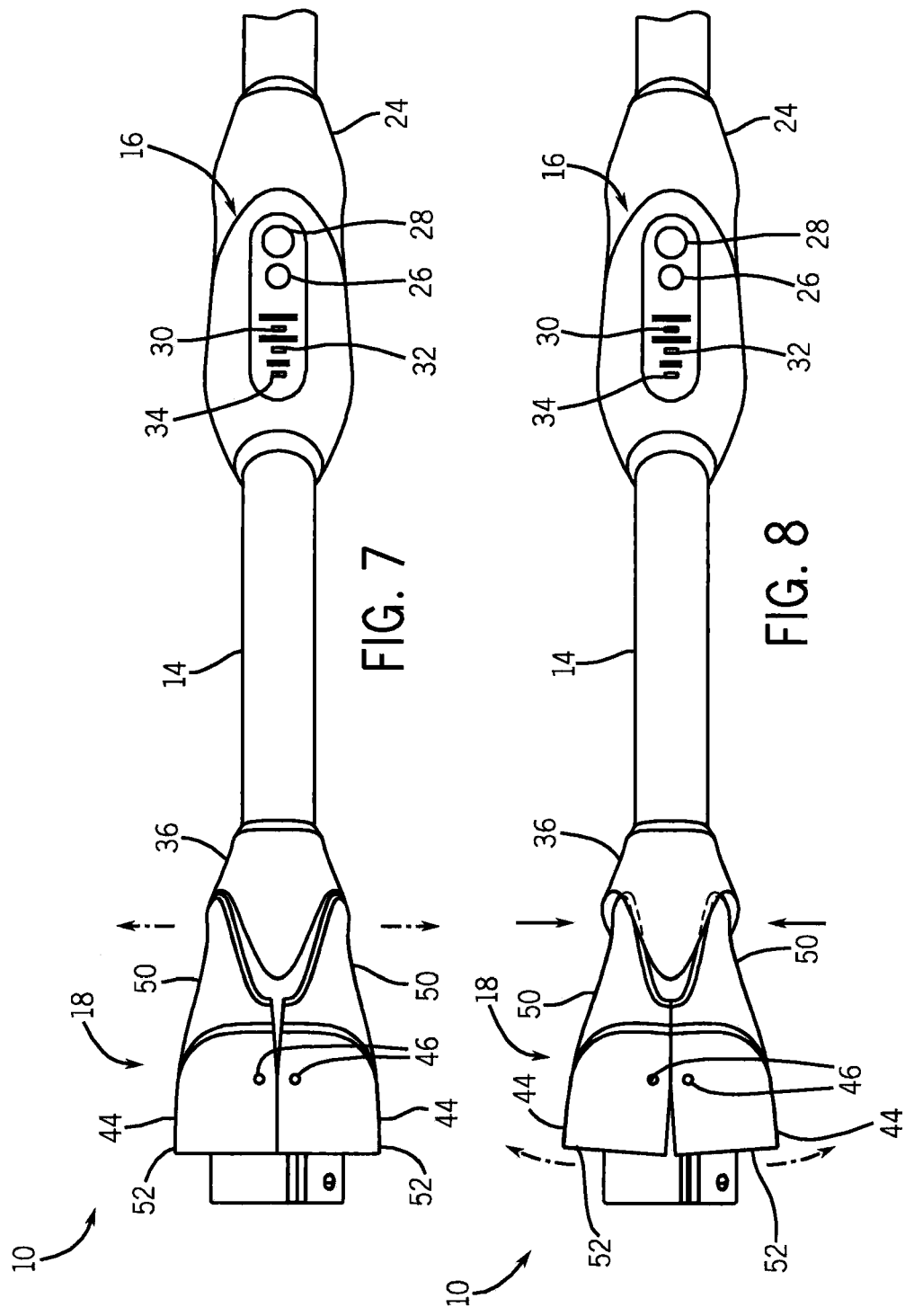

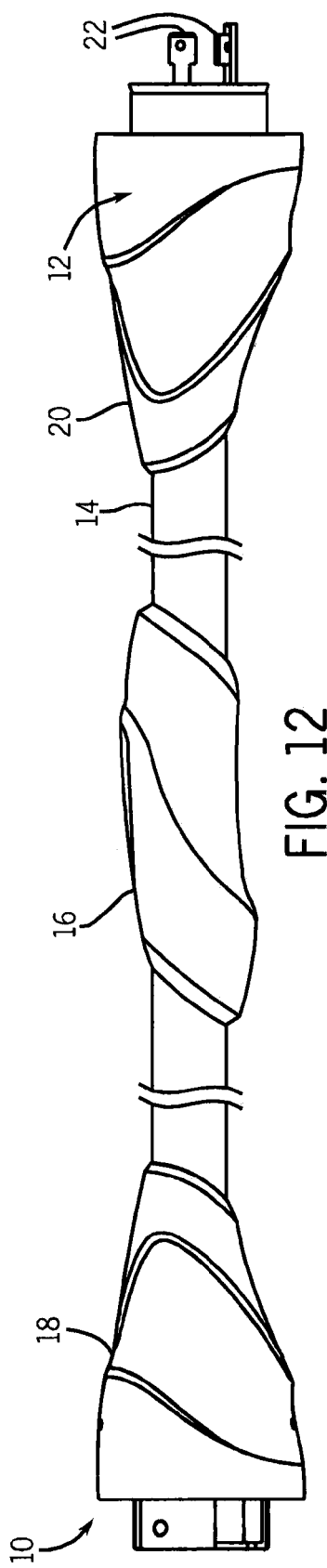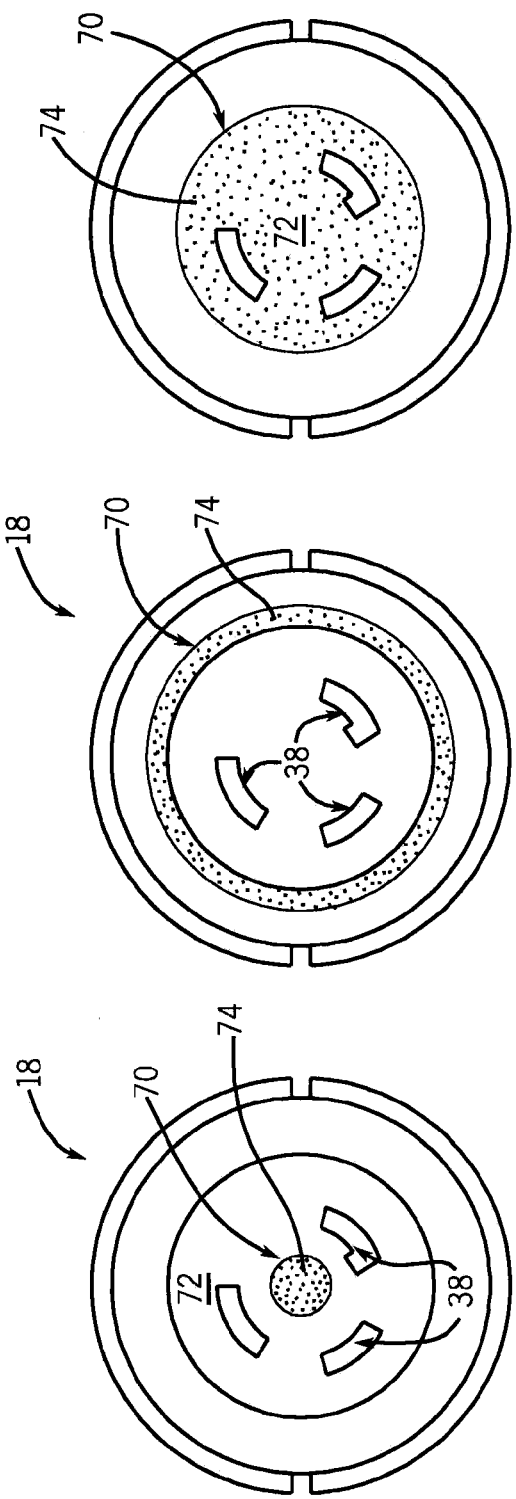

```
PORT PIN-OUT

PB0  ACTIVATE RELAY K1              PC0  GFCI-SIGNAL
PB1  ACTIVATE TEST-FAULT-CURRENT    PC1
PB2                                 PC2  BAD / LOST GROUND ERROR
PB3  ISP-MOSI                       PC3  VOLTAGE RANGE ERROR
PB4  ISP-MISO                       PC4  LINE / NEUTRAL REVERSED ERROR
PB5  ISP-SCK                        PC5
PB6                                 PC6  ISP-RESET
PB7                                 ADC6
                                    ADC7

PD0  VOLTAGE RANGE ERROR LED RED
PD1  LINE / NEUTRAL REVERSED ERROR LED RED
PD2  OFF-SWITCH
PD3  BAD / LOST GROUND ERROR LED RED
PD4  ON-SWITCH
PD5  BAD / LOST GROUND ERROR LED GREEN
PD6  VOLTAGE RANGE ERROR LED GREEN
PD7  LINE / NEUTRAL REVERSED ERROR LED GREEN
```

FIG. 23D

SHORE POWER CORD SET

CROSS-REFERENCE TO RELATED APPLICATION

This application claims the benefit of U.S. Provisional Patent Application No. 61/381,498 filed Sep. 10, 2010, and U.S. Provisional Patent Application No. 61/474,510 filed Apr. 12, 2011, the disclosures of which are hereby incorporated by reference in their entirety.

STATEMENT CONCERNING FEDERALLY SPONSORED RESEARCH OR DEVELOPMENT

Not applicable.

FIELD OF THE INVENTION

This invention relates to electrical cord sets, particularly electrical cord sets for connecting vehicles to stationary power supplies.

BACKGROUND OF THE INVENTION

Some types of electrical cords or "cord sets" are specifically designed to connect a parked or docked vehicle, such as a recreational vehicle or a boat, to a stationary power supply (i.e., a "shore power supply"). As such, these electrical cords permit electrical devices and appliances on the vehicle to be used when the vehicle's engine is turned off without taxing the vehicle's battery. In addition, these cords permit the power supply to recharge the vehicle's battery.

Unfortunately, previous shore power cord sets are relatively simple and can be difficult for a user to manipulate. For example, previous shore power cords provide no information about potentially problematic conditions at the power supply, such as reversed polarity. As another example, previous cords are also cumbersome for a user to set up; many include some type of interface component to secure the cord to the power supply, such as a threaded interface. As such, a user must twist the cord itself or a connection ring to secure the cord to the power supply, and this could be both difficult and time-consuming. Moreover, the threads can easily be cross-threaded and damaged by the user.

Considering the drawbacks of previous shore power cords, an improved design is needed.

SUMMARY OF THE INVENTION

In one aspect, the present invention provides an electrical cord set for electrically connecting a power supply to a vehicle. The cord set includes a power supply connector that has a plurality of electrical contacts configured to engage and thereby electrically connect the power supply to the power supply connector. The cord set further includes a vehicle connector that has a plurality of electrical contacts configured to engage and thereby electrically connect the vehicle to the vehicle connector. A test module electrically connects the power supply connector and the vehicle connector, and the test module has an electrical circuit. When the power supply connector is connected to the power supply the electrical circuit tests a voltage of the power supply and provides an indication if the voltage is outside of a normal operating range.

In another aspect of the invention, the electrical cord set includes a power supply connector that has a plurality of electrical contacts configured to engage and thereby electrically connect the power supply to the power supply connector. The cord set further includes a vehicle connector that has a plurality of electrical contacts configured to engage and thereby electrically connect the vehicle to the vehicle connector. A test module electrically connects the power supply connector and the vehicle connector, and the test module has an electrical circuit configured to test a polarity of the power supply when the power supply connector is connected to the power supply and provide an indication if the polarity of the power supply is reversed.

In yet another aspect of the invention, the electrical cord set includes a power supply connector that has a plurality of electrical contacts configured to engage and thereby electrically connect the power supply to the power supply connector. The electrical cord further includes a vehicle connector that has a plurality of electrical contacts configured to engage and thereby electrically connect the vehicle to the vehicle connector. A test module electrically connects the power supply connector and the vehicle connector, and the test module has an electrical circuit. When the power supply connector is connected to the power supply the electrical circuit tests for grounding of the power supply and provides an indication if grounding is not present.

In yet another aspect of the invention, the electrical cord set includes a power supply connector that has a plurality of electrical contacts configured to engage and thereby electrically connect the power supply to the power supply connector. The cord set further includes a vehicle connector that has a plurality of electrical contacts configured to engage and thereby electrically connect the vehicle to the vehicle connector. A test module electrically connects the power supply connector and the vehicle connector, and the test module has an electrical circuit. When the power supply connector is connected to the power supply the electrical circuit tests for current leakage and provides an indication if current leakage is present. The electrical circuit also tests a voltage of the power supply and provides an indication if the voltage is outside of a normal operating range. In addition, the electrical circuit tests a polarity of the power supply and provides an indication if the polarity of the power supply is reversed. Further still, the electrical circuit tests for grounding of the power supply and provides an indication if grounding is not present.

In yet another aspect of the invention, the electrical cord set includes a power supply connector that has a plurality of electrical contacts configured to engage and thereby electrically connect the power supply to the power supply connector. The cord set further includes a vehicle connector electrically connected to the power supply connector. The vehicle connector includes a plurality of electrical contacts configured to engage and thereby electrically connect the vehicle to the vehicle connector. The vehicle connector further includes a flashlight illuminated by the power supply.

In yet another aspect of the invention, the electrical cord set includes a power supply connector including a plurality of electrical contacts configured to engage and thereby electrically connect the power supply to the power supply connector. The cord set further includes a flexible electrical cord electrically connected to the power supply connector and a vehicle connector electrically connected to the flexible electrical cord. The vehicle connector includes a housing that supports a plurality of electrical contacts configured to engage and thereby electrically connect the vehicle power receptacle to the vehicle connector. The vehicle connector further includes at least two connection jaws, and each of the connection jaws is pivotally connected to the housing to move between a closed position and an open position. In the closed position the jaws are engagable with the vehicle power receptacle to secure the vehicle connector to the vehicle power receptacle, and in the open position the jaws are disengagable with the vehicle power receptacle.

In yet another aspect of the invention, the electrical cord set comprises a power supply connector including a plurality of electrical contacts configured to engage and thereby electrically connect the power supply to the power supply connector. A flexible electrical cord electrically connects to the power supply connector, and a vehicle connector electrically connects to the flexible electrical cord. The vehicle connector includes a housing supporting a plurality of electrical contacts configured to engage and thereby electrically connect the vehicle power receptacle to the vehicle connector. The vehicle connector further includes at least two connection jaws. Each of the connection jaws is pivotally connected to the housing to move from a closed position to an open position and vice versa. In the closed position the jaws are engageable with the vehicle power receptacle to secure the vehicle connector to the vehicle power receptacle, and in the open position the jaws are disengageable with the vehicle power receptacle. The electrical cord set further includes a lock member that is movable from a locked position to an unlock position and vice versa. In the locked position the lock member engages the connection jaws to inhibit the connection jaws from moving to the open position.

The foregoing and objects and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 5 is a partial side view of the cord set of FIG. 1 illustrating the vehicle connector engaged with a vehicle power receptacle;

FIG. 6 is a partial side view of the cord set of FIG. 1 illustrating the vehicle connector disengaged from a vehicle power receptacle;

FIG. 7 is a partial top view of the cord set along line 7-7 of FIG. 5;

FIG. 8 is a partial top view of the cord set along line 8-8 of FIG. 6;

FIG. 12 is a side view of the cord set of FIG. 1;

FIG. 13 is a front view of the vehicle connector of the cord set of FIG. 1 illustrating a flashlight;

FIG. 14 is a front view of the vehicle connector illustrating a second embodiment of the flashlight;

FIG. 15 is a front view of the vehicle connector illustrating a third embodiment of the flashlight;

FIGS. 23A-D are a schematic of an electrical circuit of a test module of the cord set;

DETAILED DESCRIPTION OF THE PREFERRED EMBODIMENT

Figure 1:
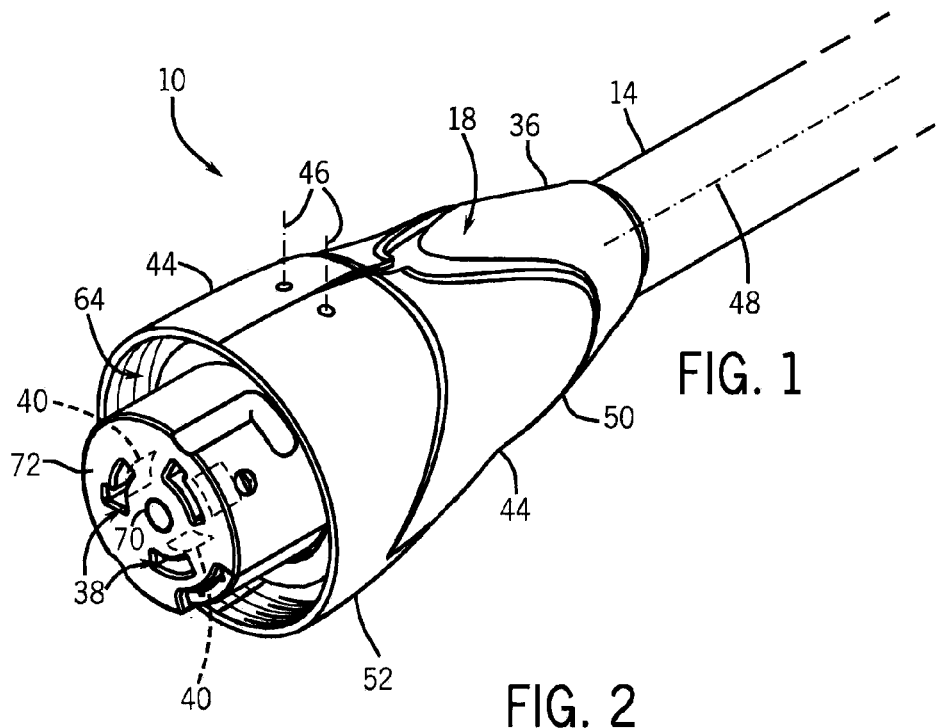
FIG. 1 is a perspective view of a vehicle connector of a shore power cord set of the present invention.
Figure 2:
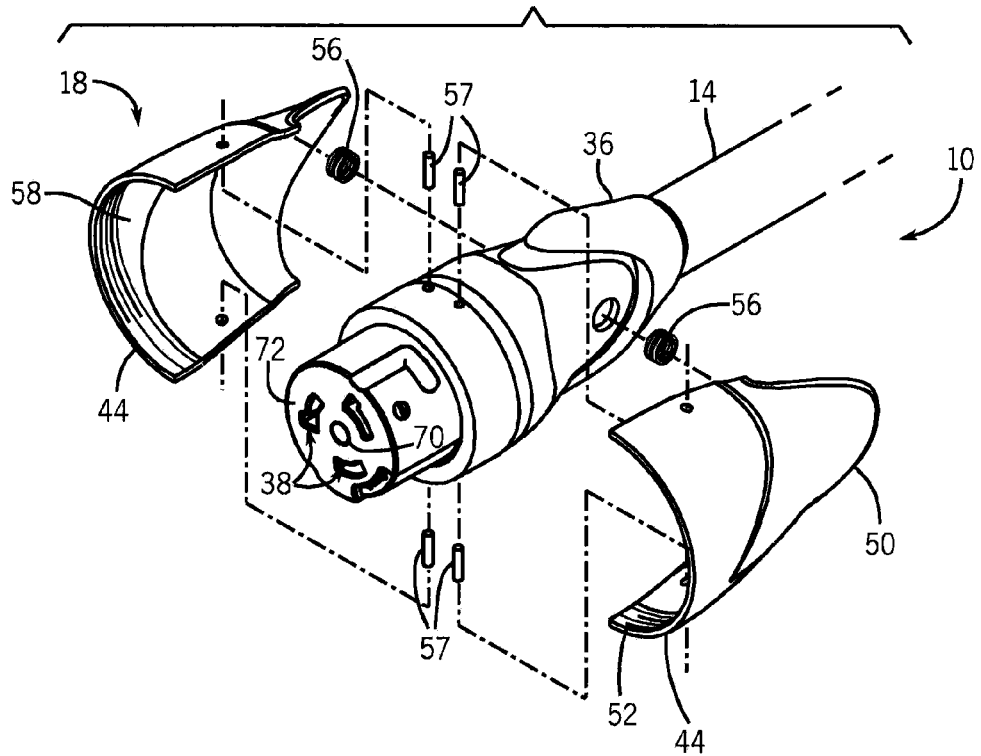
FIG. 2 is an exploded perspective view of the vehicle connector of the cord set of FIG. 1.

Referring now to FIGS. 1, 2, and 12, a shore power cord set 10 according to the present invention includes a power supply connector 12 that connects to a power supply (not shown). The power supply connector 12 also connects to a flexible and electrically conductive cord 14 opposite the power supply. The electrical cord 14 supports a test module 16 that provides information about potentially problematic conditions of the power supply when the cord set 10 is connected thereto. The electrical cord 14 also connects to a vehicle connector 18 at an end opposite the power supply connector 12. The vehicle connector 18 connects to a parked vehicle (e.g., a recreational vehicle, a boat, or the like) to thereby electrically connect the power supply and the vehicle. In the following paragraphs, the structure of the cord set 10 is first described starting with the power supply connector 12 and ending with the vehicle connector 18. Thereafter, the operations performed by the test module 16 and methods for assembling the cord set 10 are described.

Figure 17:
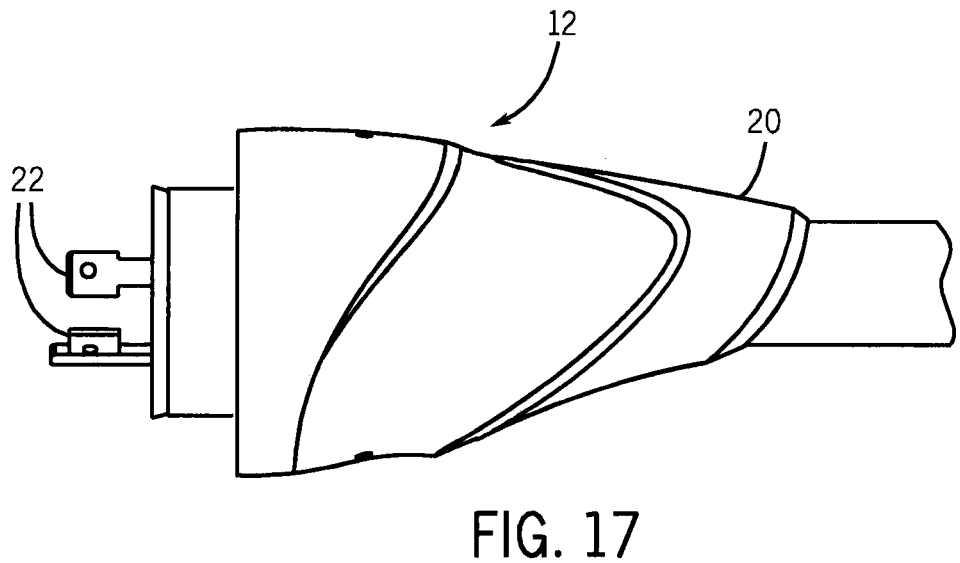
FIG. 17 is a side view of a power supply connector of the cord set of FIG. 1.

Referring now to FIGS. 12 and 17, the power supply connector 12 or "plug" end of the cord set 10 includes a housing 20 that supports a plurality of electrical contacts 22 or contact "blades". The contacts 22 are preferably arranged in the well-known configuration for a 125/250V, three pole, four wire grounding, 50A locking cord set. However, other configurations, such as the configuration for a 30A cord set or other well-known configurations provided by the National Electrical Manufacturers Association (NEMA), Independent Electrical Contractors (IEC), the Association for Electrical, Electronic, and Information Technologies (VDE), or the British Standards Institution (BSI), may alternatively be used. In any case, the electrical contacts 22 engage and thereby electrically connect the power supply to the power supply connector 12.

The electrical contacts 22 electrically connect to the electrical cord 14 in one of various manners, such as through electrical conductors (not shown) disposed within the housing 20 of the power supply connector 12. The electrical cord 14 also includes various conductive wires (not shown) that are enclosed within an outer insulating layer.

Referring to FIGS. 5-8, the electrical cord 14 supports the test module 16 along its length. The test module 16 includes a housing 24 that encloses an electrical circuit described in further detail below. The housing 24 also supports a test button 26 and a reset button 28 used to control operation of the cord set 10. A first light 30, a second light 32, and a third light 34 (e.g., light-emitting diodes or LEDs) are disposed adjacent the buttons 26 and 28 and illuminate based on the results of the operations performed by the test module 16. These aspects of the cord set 10 are also described in further detail below.

Referring now to FIGS. 1, 2, and 5-11, the electrical cord 14 connects to the vehicle connector 18 or "receptacle" end at an end opposite the power supply connector 12. The vehicle connector 18 includes a housing 36 that defines a plurality of recesses 38 (FIG. 1), and each recess 38 houses an electrical contact 40 or contact "blade" (FIG. 1). The electrical contacts 40 electrically connect to the electrical cord 14 in one of various manners, such as through electrical conductors (not shown) disposed within the housing 36 of the vehicle connector 18. In addition, the recesses 38 and the electrical contacts 40 are preferably arranged in the well-known configuration for a 125/250V, three pole, four wire grounding, 50A locking cord set. However, other configurations, such as the configuration for a 30A cord set, other well-known configurations provided by NEMA, IEC, VDE, BSI, or any configuration employed by the power supply connector 12, may alternatively be used. In any case, the electrical contacts 40 engage and electrically connect the vehicle power receptacle 42 (FIGS. 5 and 6) to the vehicle connector 18 to thereby electrically connect the power supply and the vehicle.

In addition to the housing 36, the vehicle connector 18 includes two connection jaws 44 that are movable to secure the vehicle connector 18 to the vehicle power receptacle 42. Each of the connection jaws 44 is disposed outwardly of the housing 36 and pivots about an axis 46 that is perpendicular to the longitudinal axis 48 of the electrical cord 14. The pivot axis 46 is disposed such that a proximal portion 50 of the connection jaw 44 may be moved toward the housing 36 to pivot a distal portion 52 of the connection jaw 44 away from the housing 36. In this "open" position (FIGS. 8, 10, and 11) the connection jaws 44 are spaced apart from a receptacle inlet 54 of the power receptacle 42, and as such, the vehicle connector 18 may be placed over or separated from the power receptacle 42. To return the vehicle connector 18 to the closed position, the proximal portions 50 of the connection jaws 44 may simply be released so that compression springs 56 disposed between the housing 36 and the proximal portions 50 urge the distal portions 52 toward the housing 36. If the vehicle connector 18 is placed over the vehicle power receptacle 42, the distal portions 52 of the connection jaws 44 are forced into engagement with the receptacle inlet 54 to thereby secure the vehicle connector 18 to the power receptacle 42.

Figure 3:
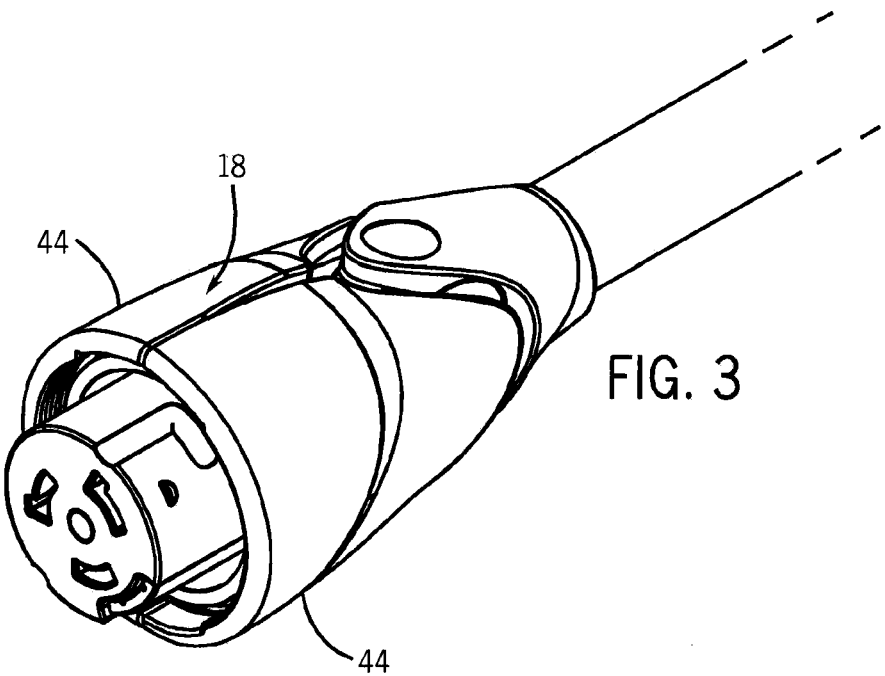
FIG. 3 is a perspective view of a second embodiment of the vehicle connector of the cord set of the present invention.
Figure 4:
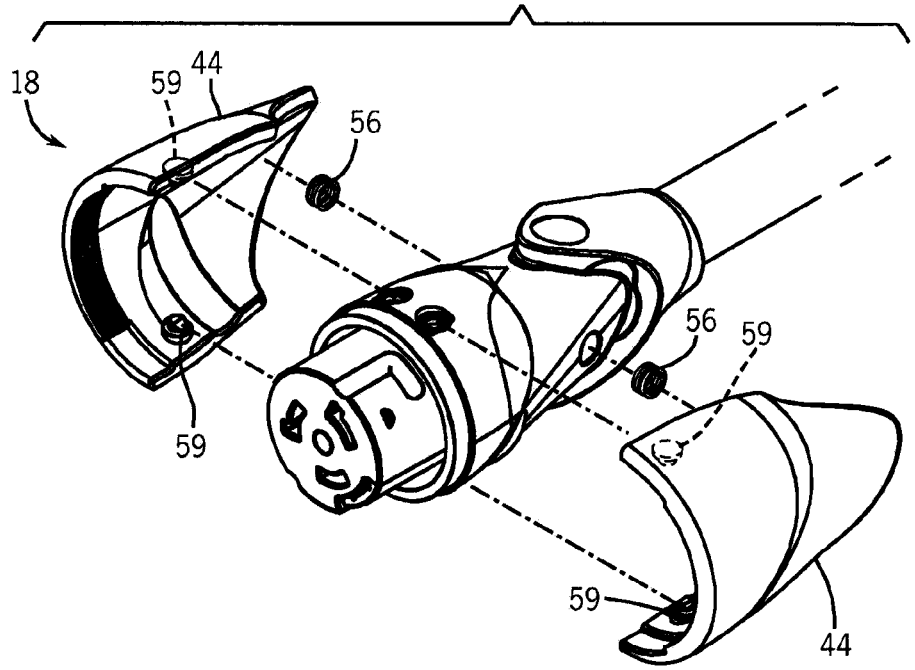
FIG. 4 is an exploded perspective view of the vehicle connector the cord set of FIG. 3.
Figure 9:
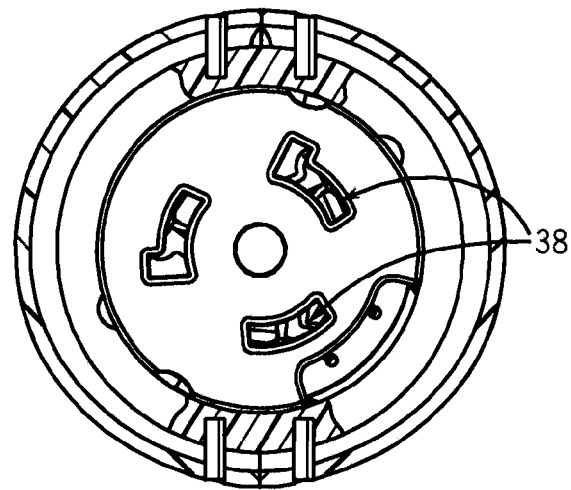
FIG. 9 is a section view of the vehicle connector of the cord set along line 9-9 of FIG. 5.

The connection jaws 44 may take other forms instead of including separate pivot pins 57. For example and as shown in FIGS. 3 and 4, the connection jaws 44 may include integral pivots 59 that permit the jaws 44 to pivot from the open position to the closed position and vice versa.

The external surfaces 60 of most receptacle inlets 54 are threaded to cooperate with the previous shore power cord sets described above. Specifically, the external surfaces 60 may have, for example, 2¾ inch diameter threads (i.e., 2.670 inch minor diameter, 2.735 inch major diameter) with 16 threads per inch. Other sizes of the external surfaces 60 may be as specified by the American Boat and Yacht Council (ABYC). In any case, the distal portions 52 of the connection jaws 44 preferably have internal threaded surfaces 58 (e.g., 2-¾ inch diameter threads with 16 threads per inch) to securely engage the external threaded surface 60 of the receptacle inlet 54. As such, the cord set 10 is compatible with vehicle power receptacles 42 that are already in use.

In some embodiments the internal surface 58 of one of the connection jaws 44 includes a locking tab (not shown) that is accommodated within a right-angle locking slot 62 (FIGS. 5 and 6) when the vehicle connector 18 is positioned over the power receptacle 42. As such, the vehicle connector 18 may be pivoted about the longitudinal axis 48 of the electrical cord 14 after the connection jaws 44 engage the power receptacle 42 to further secure the vehicle connector 18 to the power receptacle 42.

Furthermore, in some embodiments the connection jaws 44 may include a lock mechanism (not shown) that is engaged to hold the connection jaws 44 in the closed position. The lock mechanism may take various forms, such as a wedge that may be positioned between the proximal portions 50 of the connection jaws 44, a ring that may be positioned around the distal portions 52 of the connection jaws 44, or a slider positioned at the interface of the distal portions 52 that is movable to engage both of the connection jaws 44.

Figure 10:
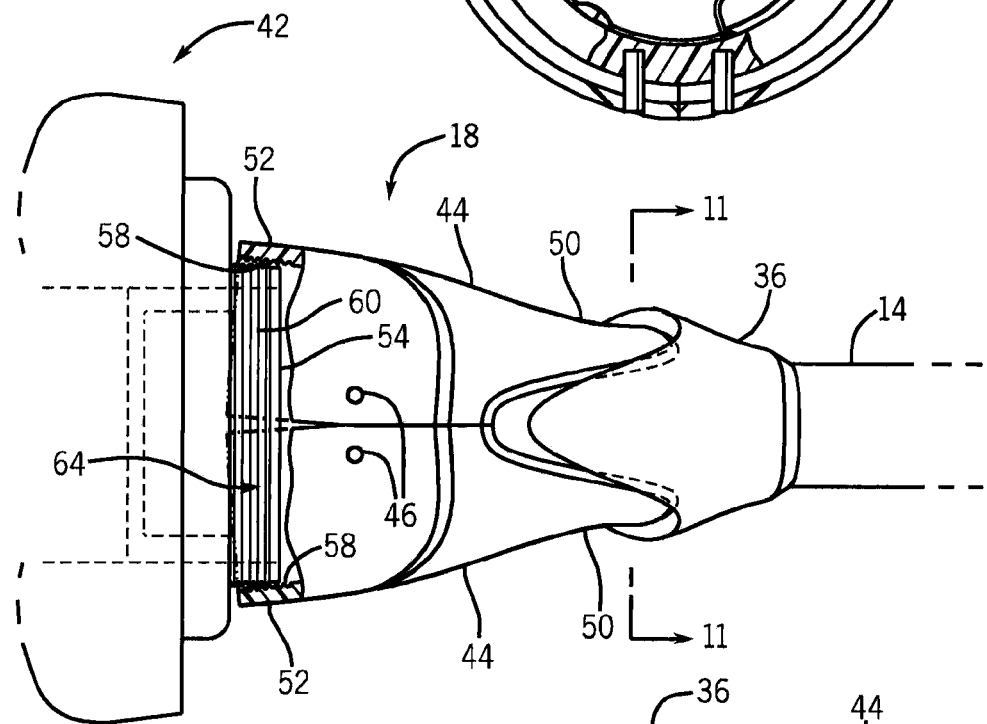
FIG. 10 is a partial section view of the vehicle connector of the cord set of FIG. 1 with connection jaws engaging the vehicle power receptacle.
Figure 11:
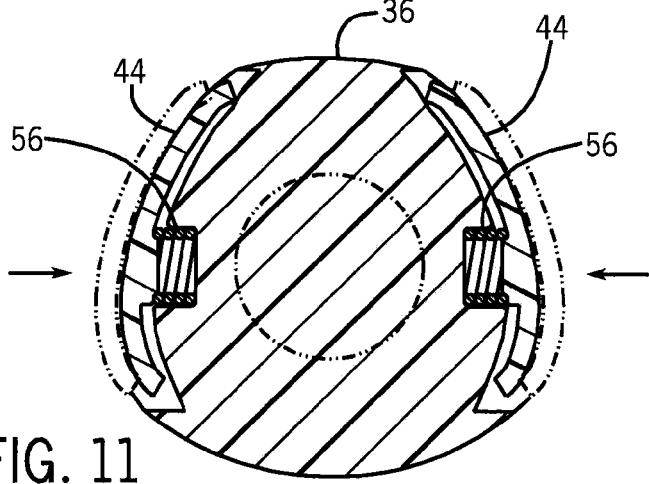
FIG. 11 is a section view of the vehicle connector along line 11-11 of FIG. 10.

As shown most clearly in FIGS. 1 and 10, the distal portions 52 of the connection jaws 44 define a recess 64 in which the receptacle inlet 54 is accommodated. Referring to FIGS.

Figure 19:
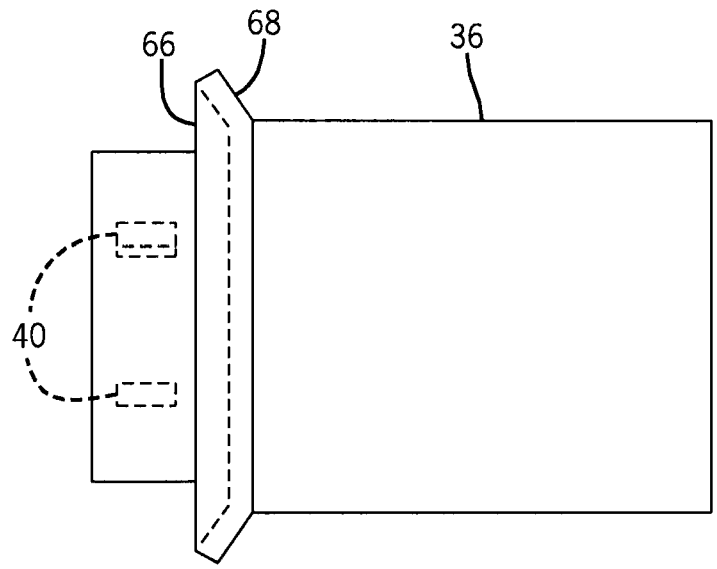
FIG. 19 is a side view of the housing of the vehicle connector of the cord set of FIG. 1 illustrating a sealing component.
Figure 20:
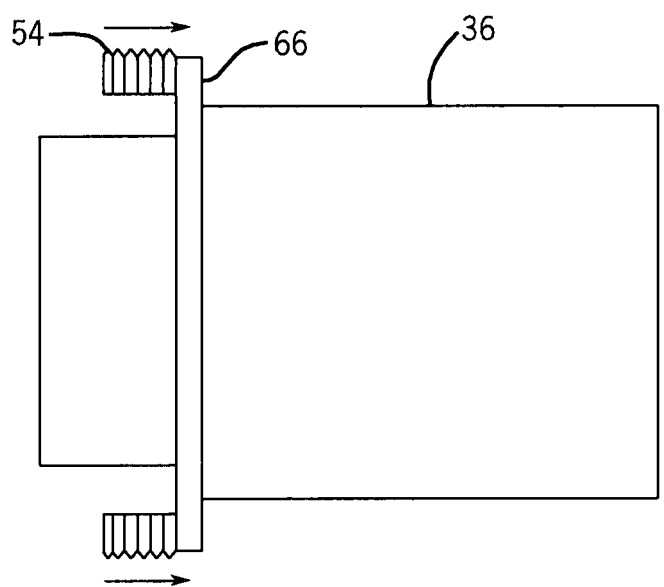
FIG. 20 is a side view of the sealing component of FIG. 19 being engaged by a receptacle inlet of the vehicle power receptacle.
Figure 21:
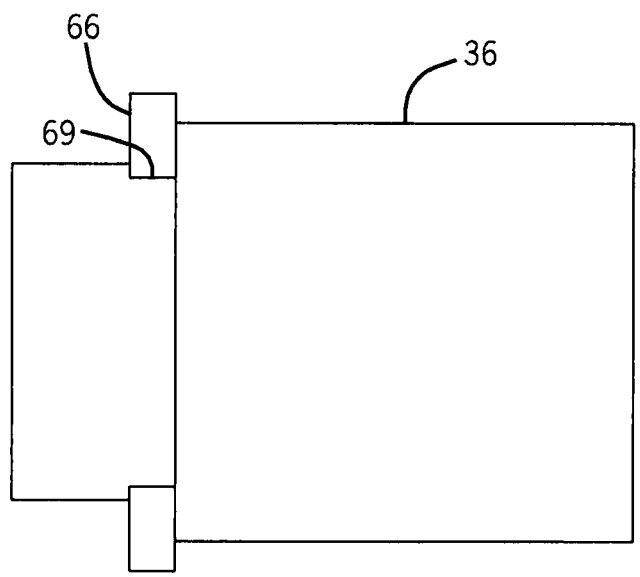
FIG. 21 is a side view of a second embodiment of the sealing component of the vehicle connector.
Figure 22:
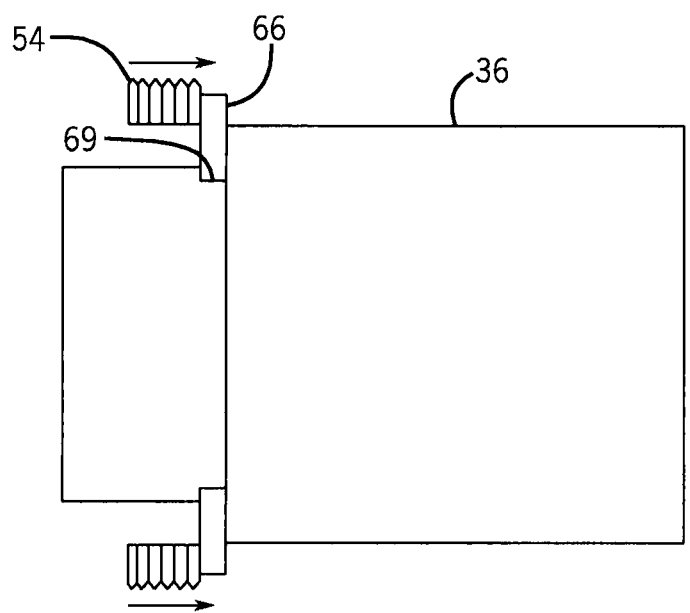
FIG. 22 is a side view of the sealing component of FIG. 21 being engaged by the receptacle inlet of the vehicle power receptacle.
Figure 23A:
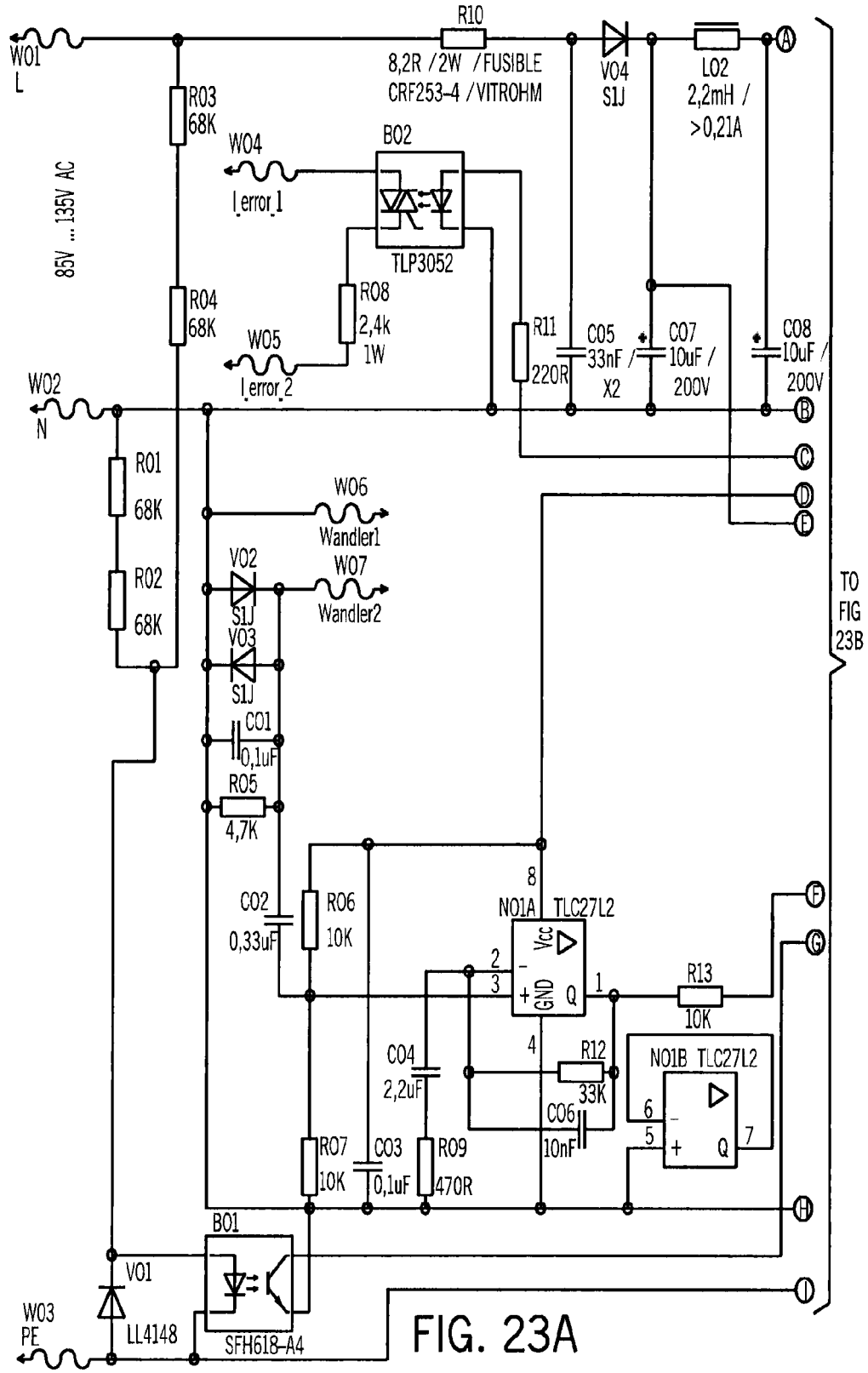
Figure 23B:
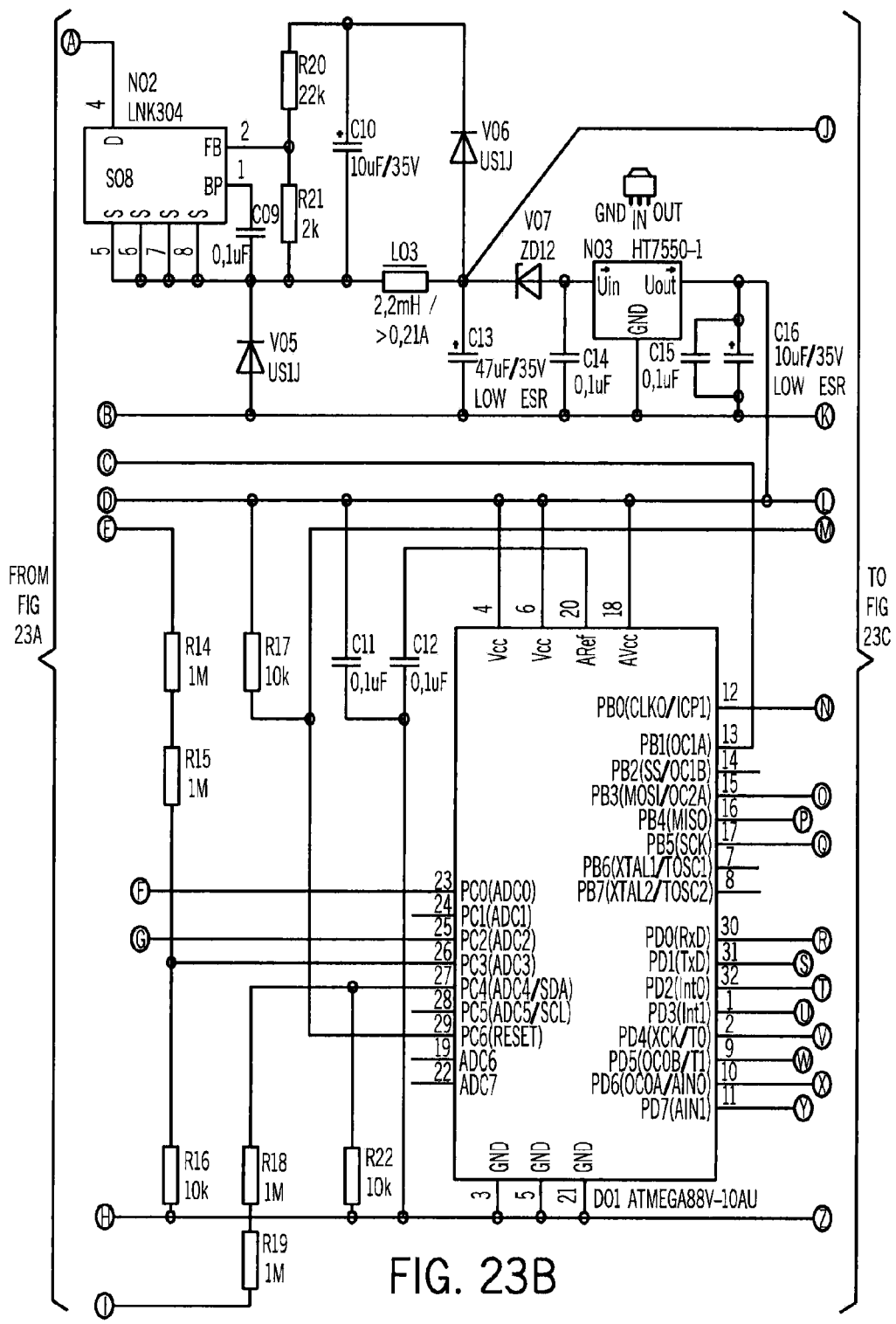
Figure 23C:
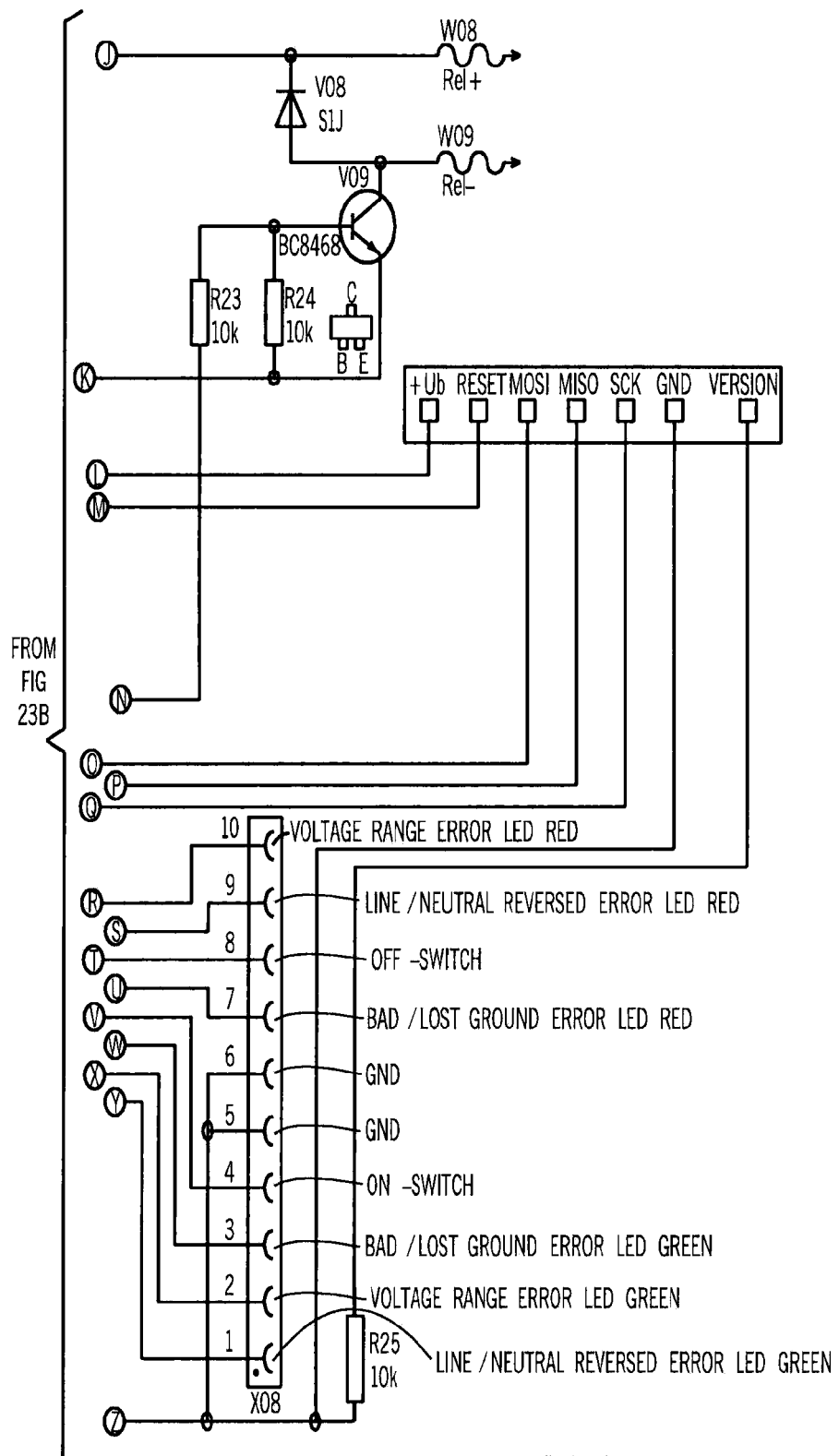

19-22, the recess 64 also houses a sealing component 66 that isolates the electrical contacts 40 from the outside environment when the cord set 10 is connected to a vehicle. In general, the sealing component 66 is engaged by the receptacle inlet 54, although the specific structure of the sealing component 66 may take various forms. For example and referring specifically to FIGS. 19 and 20, the sealing component 66 may have an angled perimeter 68 that is bent when engaged by the receptacle inlet 54 to provide a seal. Such a sealing component may be integrally formed with the housing 36 and comprise polyvinyl chloride (PVC) or silicon, or the sealing component may be a separate component from the housing 36. As another example and referring specifically to FIGS. 21 and 22, the sealing component 66 may alternatively comprise a closed-cell foam that is stretched over a channel 69 in the housing 36. As yet another example, the sealing component 66 may be a QUAD-RING® seal, a modified QUAD-RING® seal, a QUAD-BON® seal, a QUAD-KRUP® seal, or any other appropriate seal manufactured by DMR Seals of Sheffield, United Kingdom. The sealing component 66 may alternatively take other forms that are not explicitly described herein.

Referring now to FIGS. 1, 2, 13-15, and 18, the housing 36 of the vehicle connector 18 also supports a flashlight 70. In general, the flashlight 70 emits light from the distal face 72 of the housing 36 (i.e., the surface that defines openings to the recesses 38 in the housing 36). The specific structure of the flashlight 70, however, may take various forms. For example and referring specifically to FIG. 18, the flashlight 70 may comprise a transparent or translucent light guide 74 and an LED 76 that is electrically connected to the electrical cord 14. In some embodiments, such as the embodiment shown in FIG. 13, the light guide 74 may be disposed between the housing recesses 38. In other embodiments, such as the embodiment shown in FIG. 14, the light guide 74 has an annular shape that circumscribes the recesses 38. In still other embodiments, such as the embodiment shown in FIG. 15, the light guide 74 substantially defines the entire distal face 72 of the vehicle connector housing 36. The flashlight 70 may alternatively take other forms that are not explicitly described herein.

Figure 16:
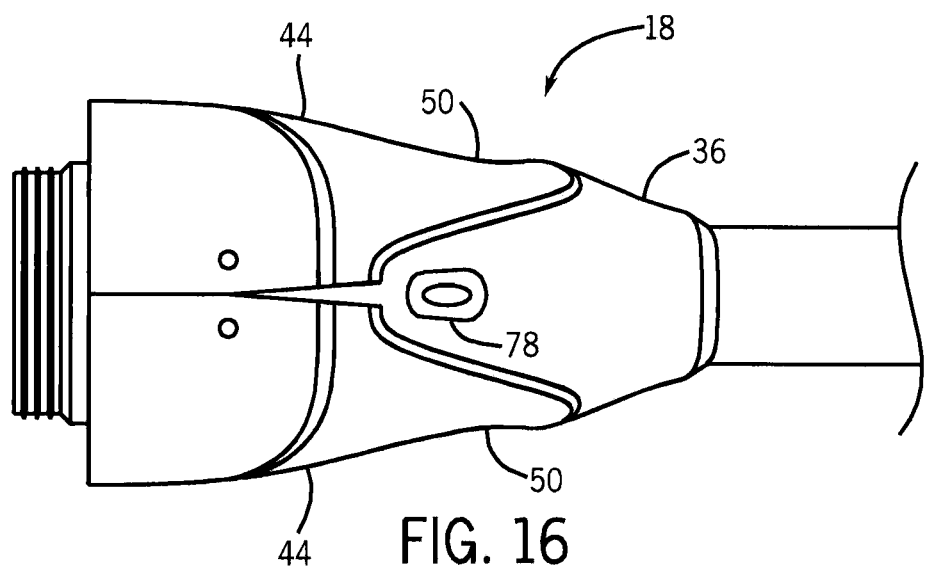
FIG. 16 is a top view of the vehicle connector of the cord set of FIG. 1 illustrating a power-indicating light.
Figure 18:
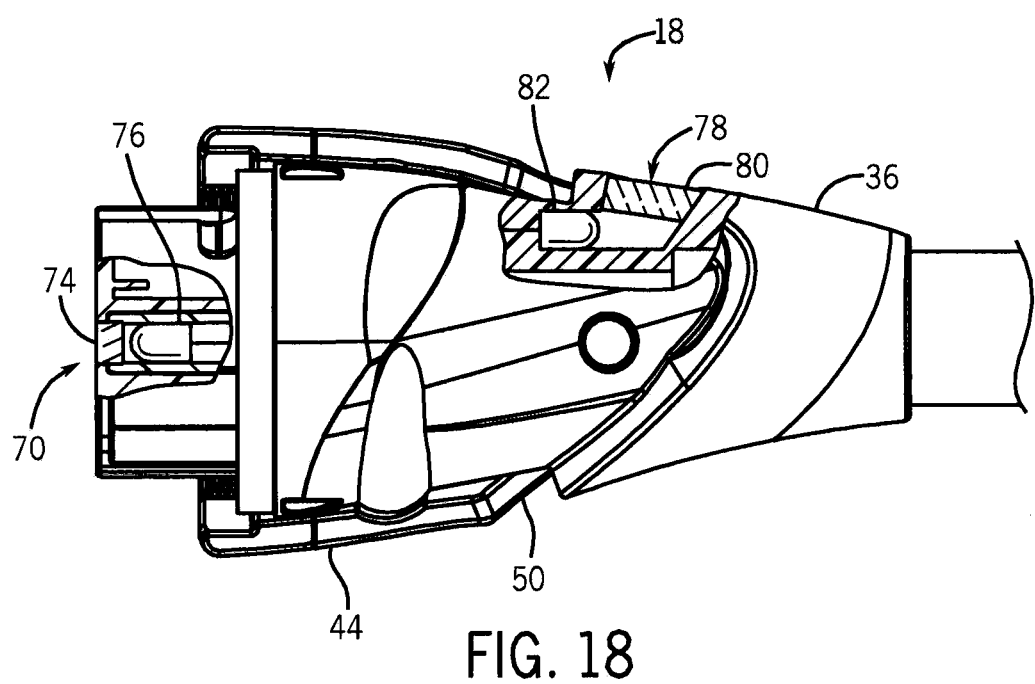
FIG. 18 is a partial sectional view of a housing of the vehicle connector of the cord set of FIG. 1 illustrating a flashlight and a power indicator light.

Referring to FIGS. 16 and 18, the housing 36 of the vehicle connector 18 also supports a power indicator light 78 proximal the proximal portions 50 of the connection jaws 44. The power indicator light 78 emits light when the power supply connector 12 is connected to the power supply. The indicator light 78 may comprise a light guide 80 (FIG. 18) and an LED 82 that is electrically connected to the electrical cord 14, although other structures may alternatively be used.

The operations performed by the test module 16 are described hereafter. The test module 16 includes an electrical circuit that is schematically depicted in FIGS. 23A-D. The electrical circuit performs several tests to evaluate the condition of the cord set 10 and the power supply when the power supply connector 12 is connected to the power supply (regardless of whether or not the vehicle connector 18 is connected to a vehicle). First, the circuit automatically performs a current leakage test or "ground fault circuit interrupter" (GFCI) test to determine if the cord set 10 or the vehicle provides a current leakage path. If current leakage is detected, the test module 16 prevents power from being transmitted from the power supply to the vehicle and the first light 30 flashes red to indicate that current leakage has been detected. The cord set 10 may be reset by either pressing the reset button 28 or disconnecting the cord set 10 from the power supply. Conversely, if current leakage is not detected, the lights 30, 32, and 34 flash green for five seconds. A manual current leakage test may be conducted at any time thereafter by using the test button 26, and the cord set 10 may be reset as described above.

After any passed current leakage test, the test module 16 next performs tests to evaluate the condition of the power supply. In addition, the test module 16 may illuminate the lights 30, 32, and 34 in various manners to indicate the results of the tests. For example, the test module 16 conducts a voltage test to determine if the power supply's voltage is outside of a normal operating range (e.g., 90V to 135V). In some embodiments, if the power supply's voltage is outside of the normal operating range, the first light 30 is continuously illuminated in red and the second and third lights 32 and 34 are continuously illuminated in green. As another example, the test module 16 conducts a reverse polarity test to determine if the polarity of the power supply is reversed. In some embodiments, if the polarity of the power supply is reversed, the second light 32 is continuously illuminated in red and the first and third lights 30 and 34 are continuously illuminated in green. In some embodiments, the test module 16 may be configured to correct reverse polarity and provide proper polarity at the vehicle connector 18. As yet another example, the test module 16 also conducts a ground test to determine if the power supply is grounded. In some embodiments, if the power supply is not grounded, the third light 34 is continuously illuminated in red and the first and second lights 30 and 32 are continuously illuminated in green. If none of the above errors are present, the first, second, and third lights 30, 32, and 34 are continuously illuminated in green. Furthermore, multiple lights 30, 32, or 34 may be simultaneously illuminated in red to indicate multiple simultaneous errors (e.g., lights 30 and 32 may be illuminated in red and light 34 may be illuminated in green to indicate both a voltage outside of the normal operating range and reversed polarity of the power supply). After the above tests are conducted, and if the vehicle connector 18 is not connected to a vehicle, the first light 30 flashes green to indicate that the cord set 10 is in a "standby" mode and ready to be connected to a vehicle.

In the event of a power outage, the cord set 10 automatically reactivates and performs the tests described above when power is restored. Furthermore, the cord set 10 automatically reactivates and performs the tests described above if the test button 26 is pressed followed by pressing the reset button 28.

Figure 24:
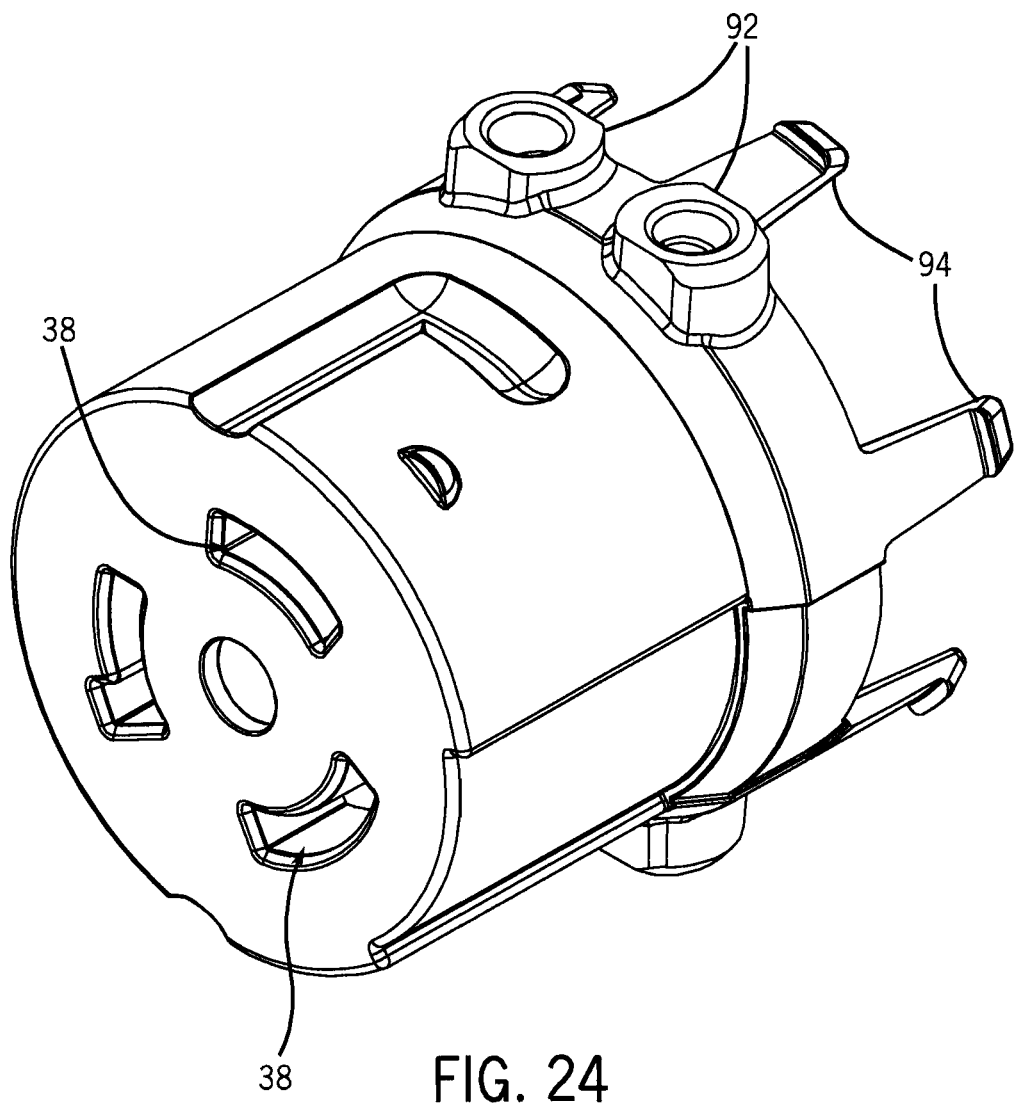
FIG. 24 is a front perspective view of a base of the vehicle connector of the cord set.
Figure 25:
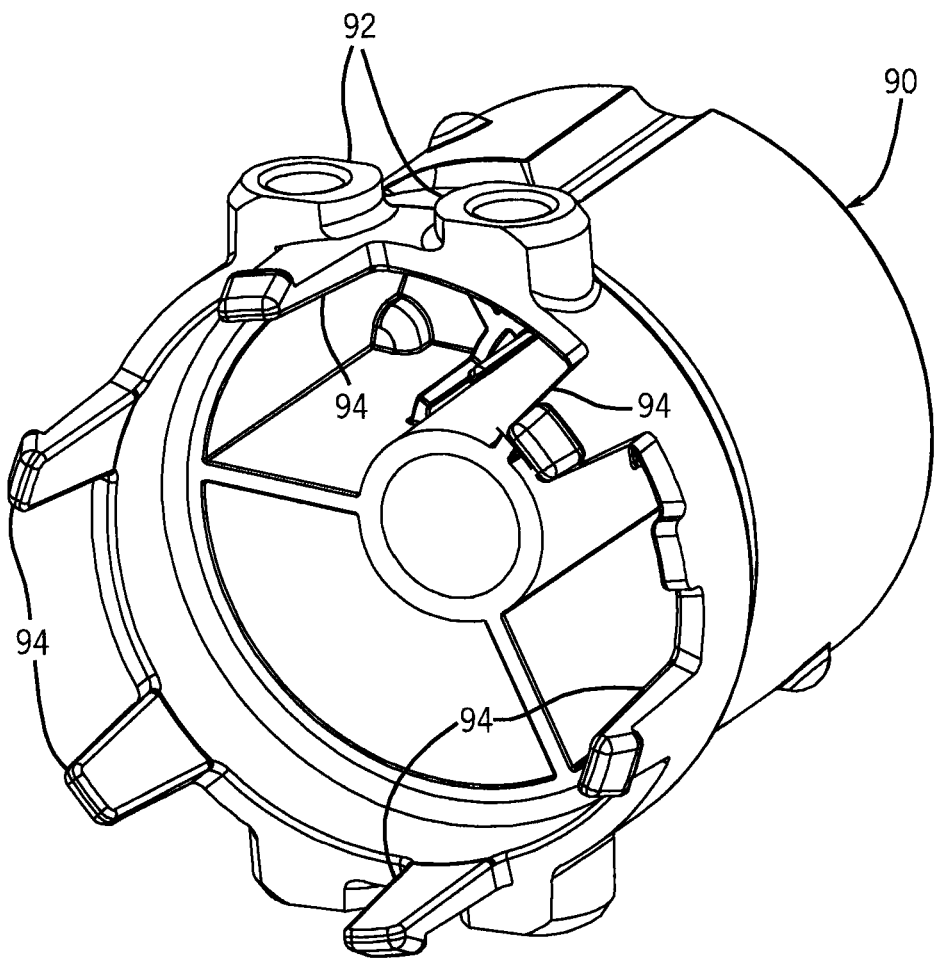
FIG. 25 is a rear perspective view of the base of FIG. 24.
Figure 26:
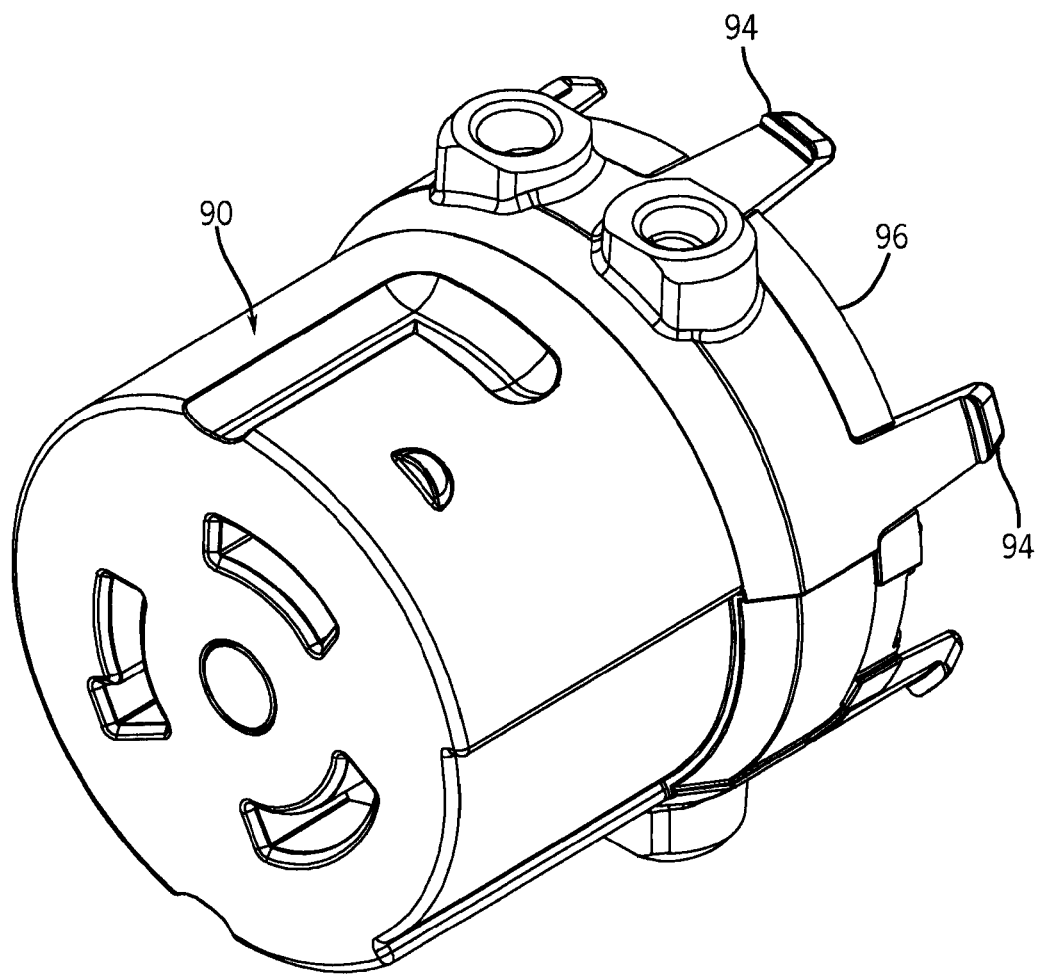
FIG. 26 is a front perspective view of a manufacturing subassembly including a contact housing connected to the base of FIG. 24.
Figure 27:
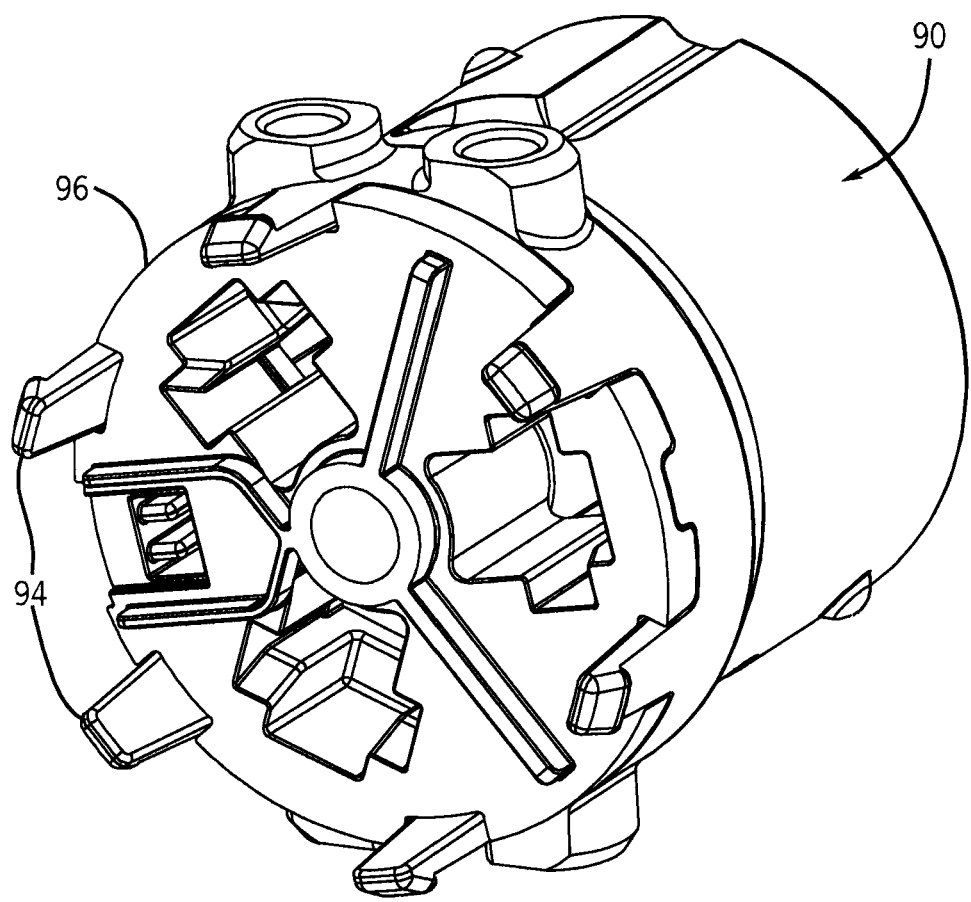
FIG. 27 is a rear perspective view of the subassembly of FIG. 26.
Figure 28:
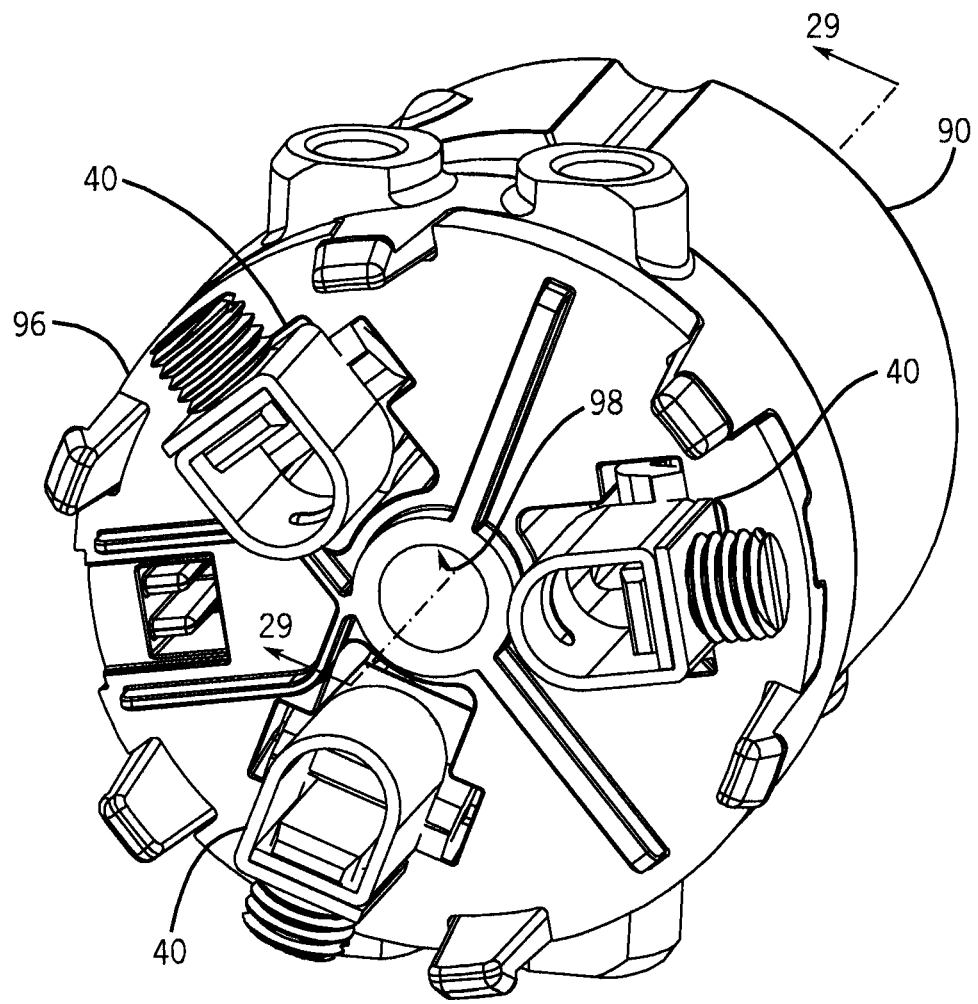
FIG. 28 is a rear perspective view of a manufacturing subassembly including electrical contacts and the subassembly of FIG. 26.
Figure 29:
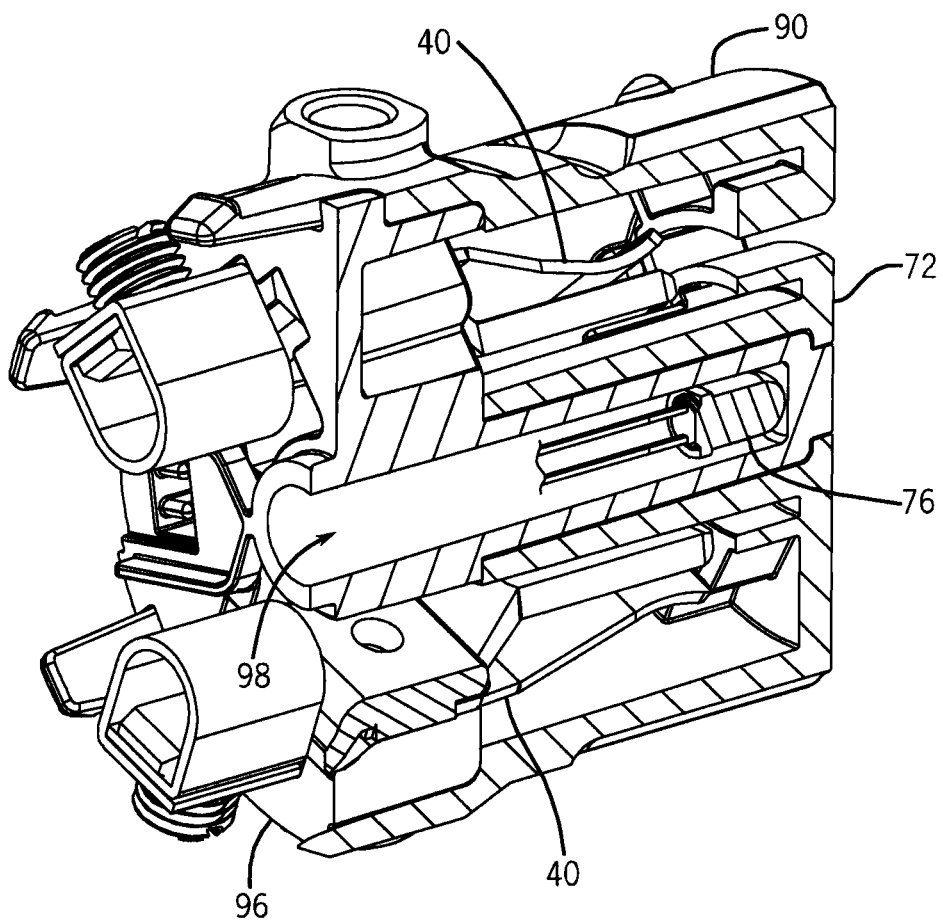
FIG. 29 is a section view along line 29-29 of FIG. 28.
Figure 30:
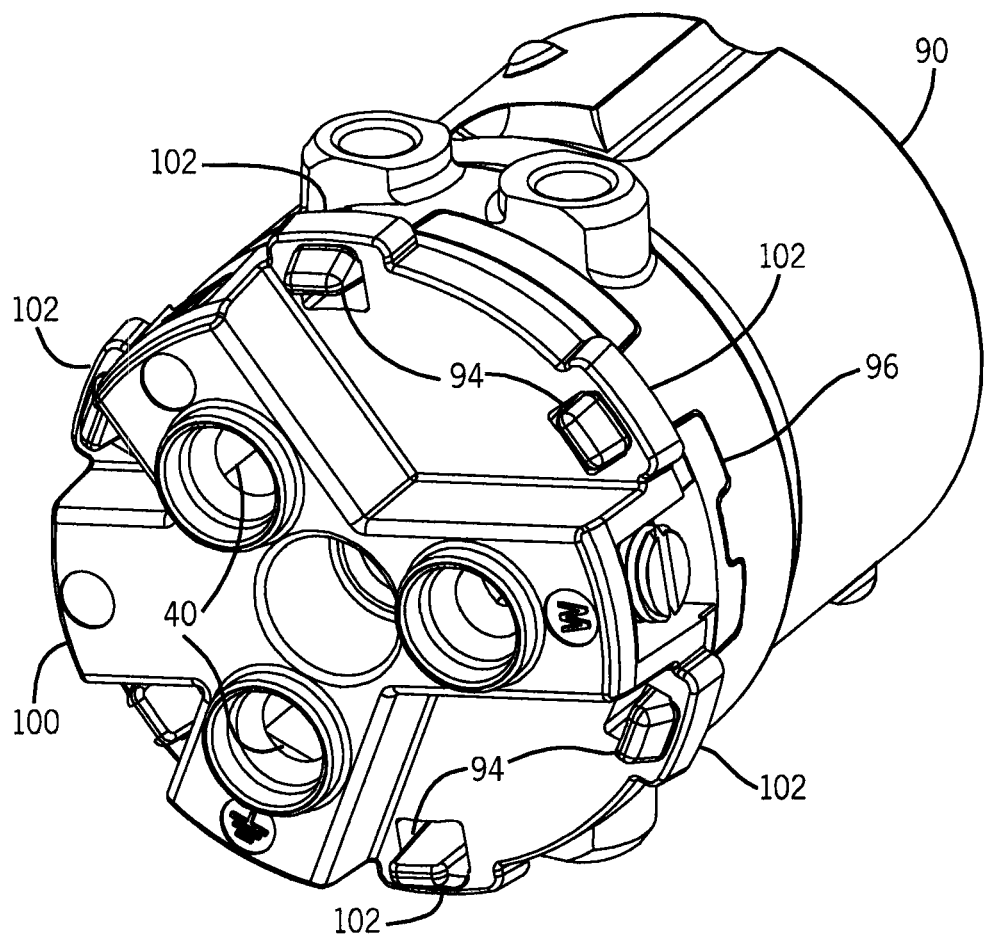
FIG. 30 is a rear perspective view of a manufacturing subassembly including an end cap and the subassembly of FIG. 28.
Figure 31:
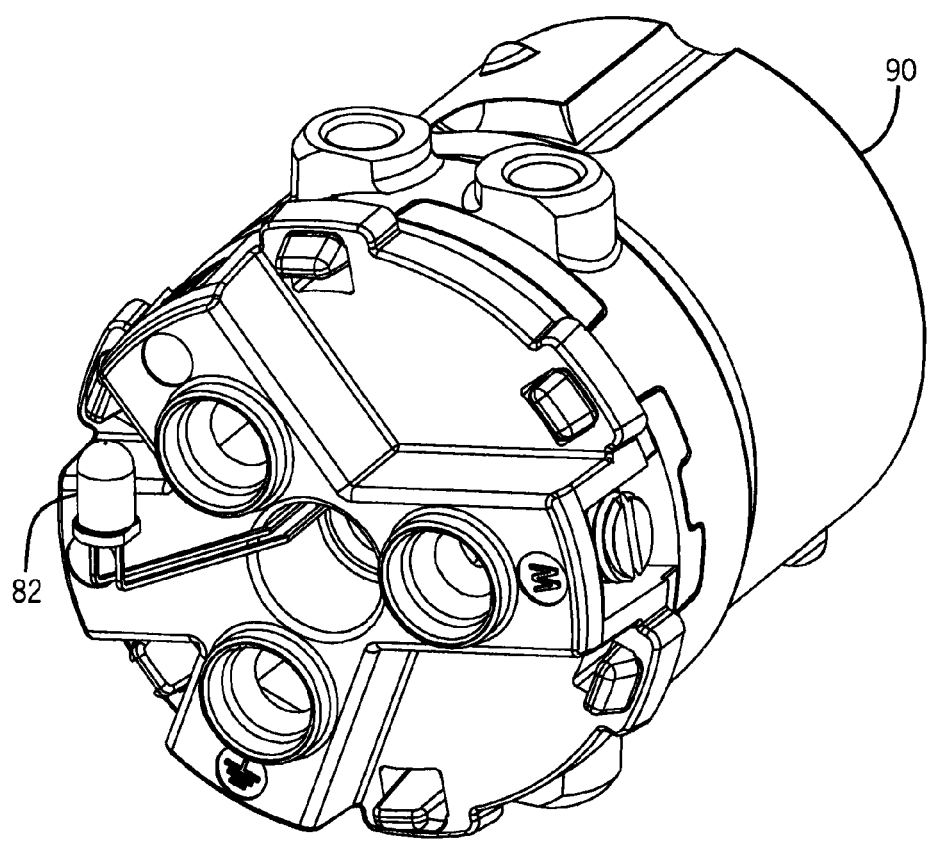
FIG. 31 is a rear perspective view of a manufacturing subassembly including an LED and the subassembly of FIG. 30.
Figure 32:
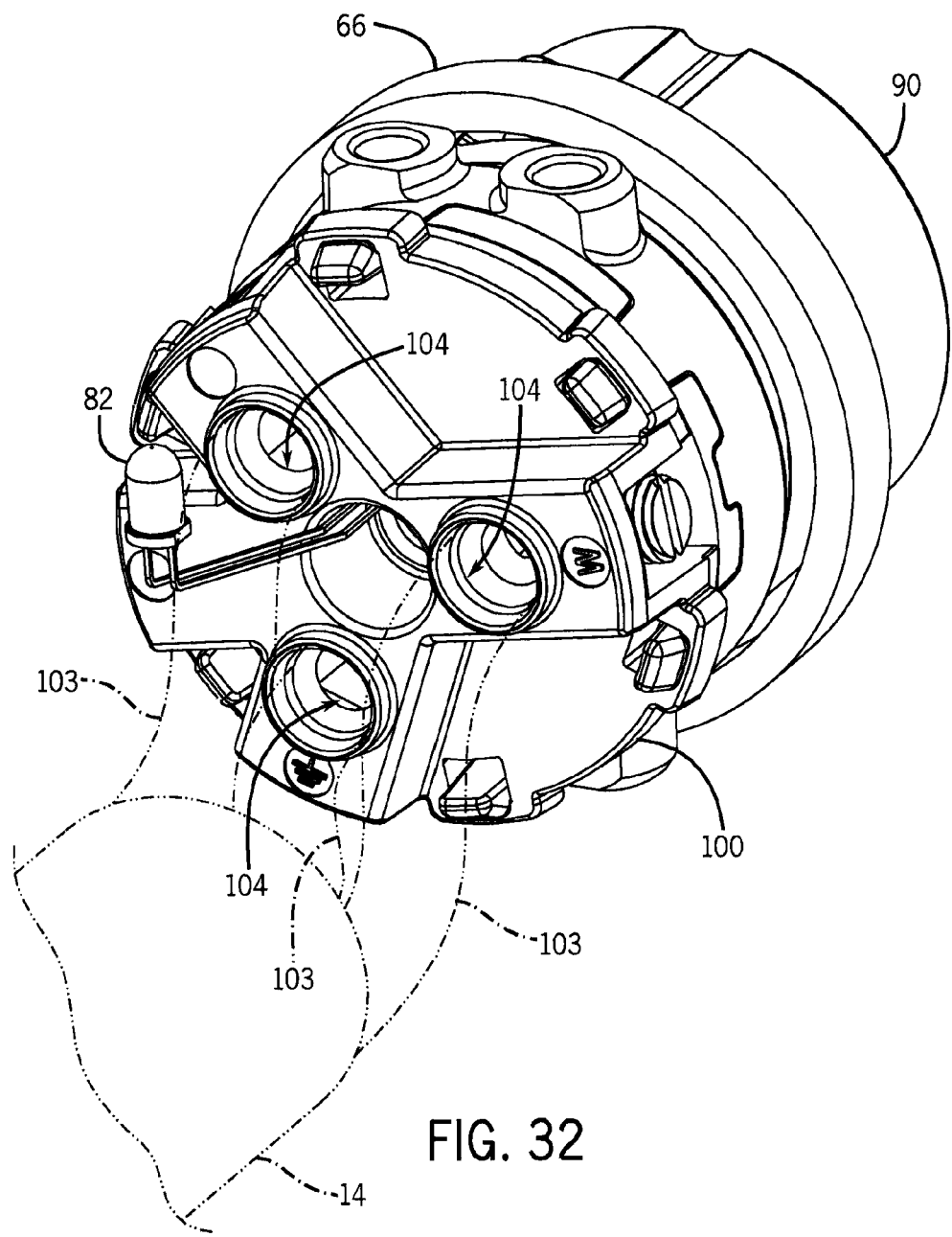
FIG. 32 is a rear perspective view of a manufacturing subassembly including a sealing component, a cord, and the subassembly of FIG. 31.
Figure 33:
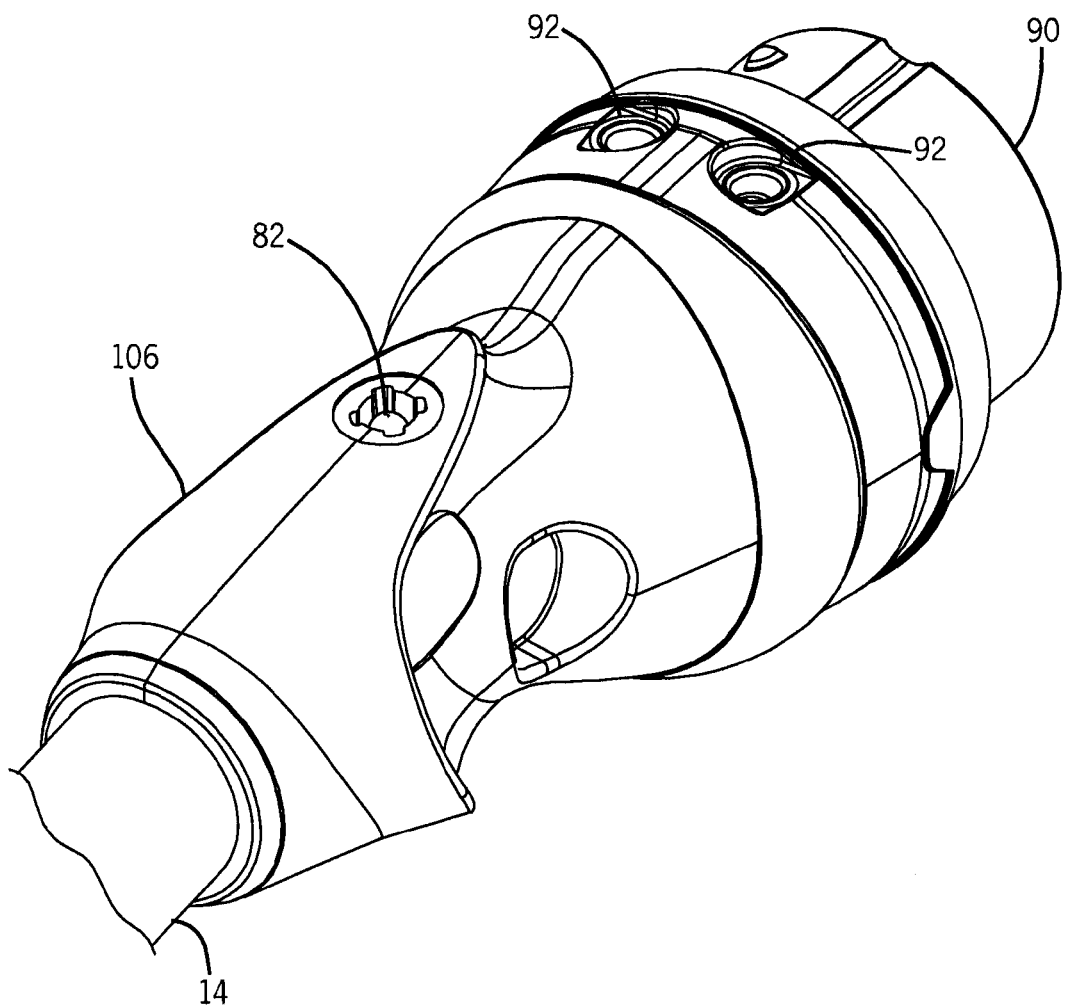
FIG. 33 is a rear perspective view of a manufacturing subassembly including an overmolded outer body and the subassembly of FIG. 32.
Figure 34:
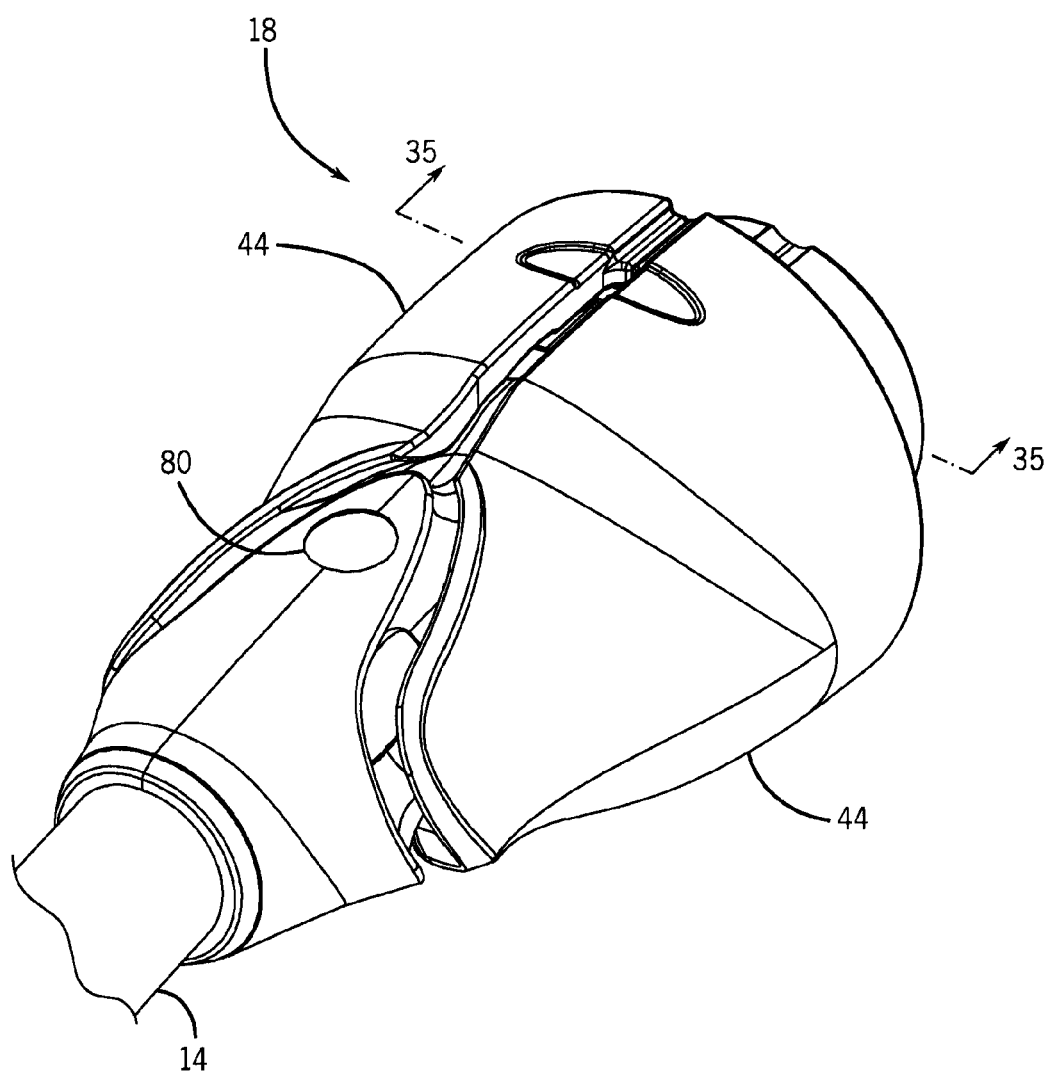
FIG. 34 is a rear perspective view of the completed vehicle connector of the cord set.
Figure 35:
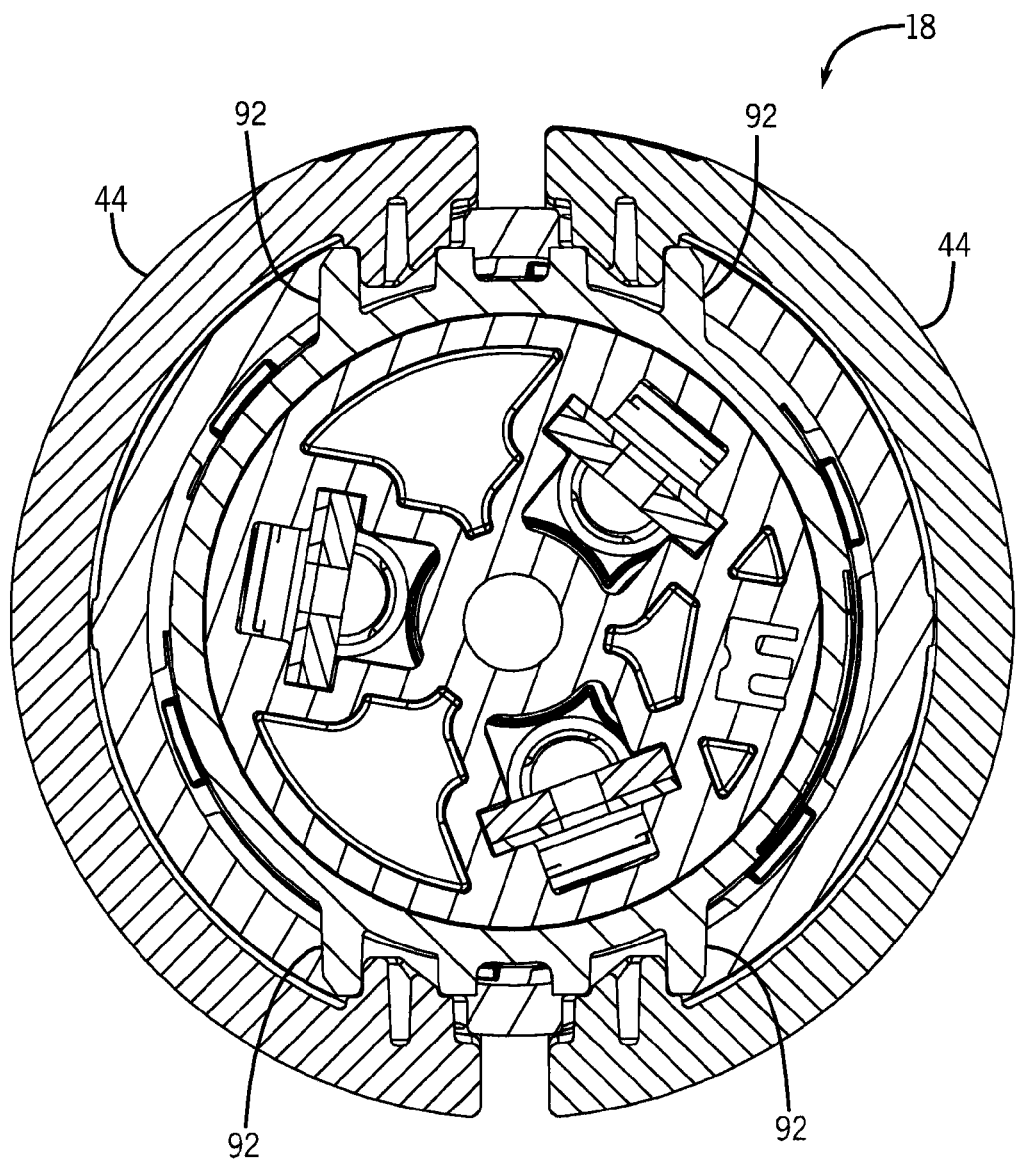
FIG. 35 is a section view along line 35-35 of FIG. 34.
Figure 36:
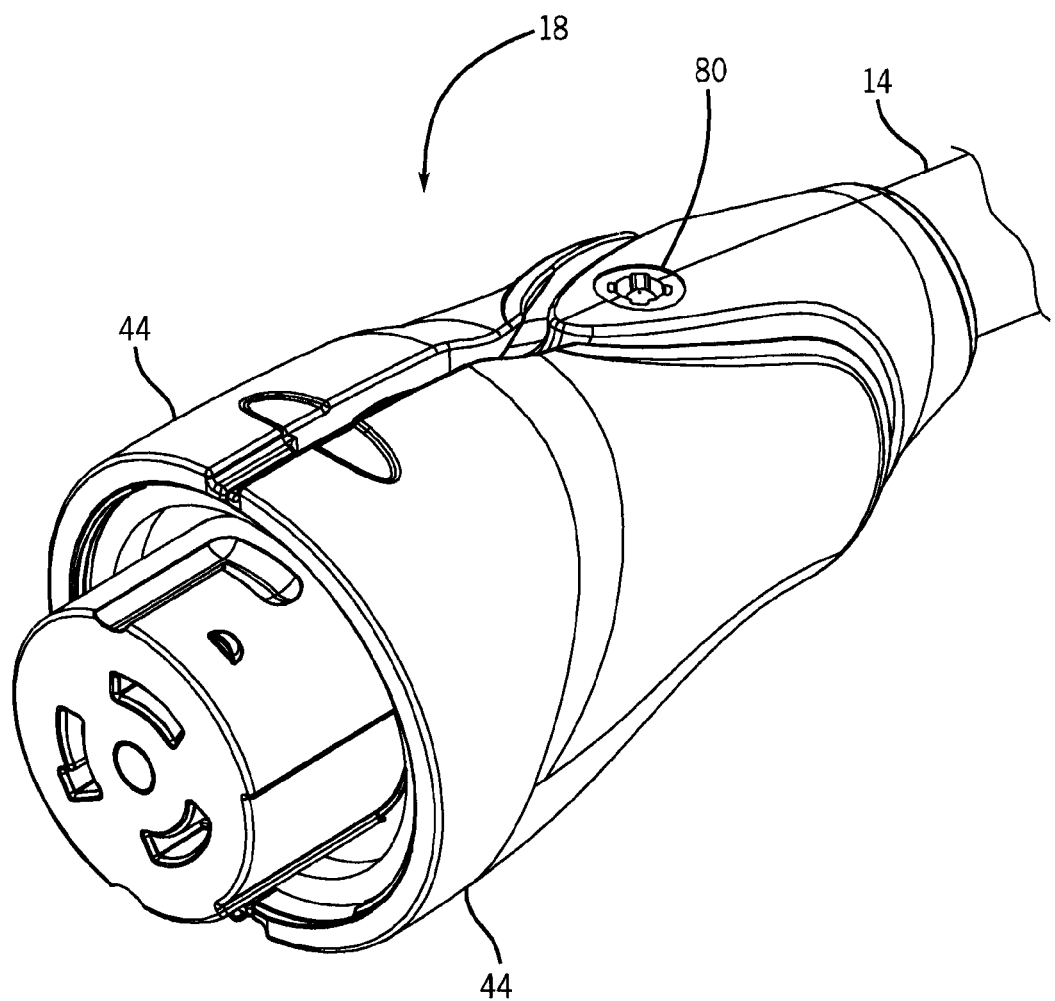
FIG. 36 is a front perspective view of the completed vehicle connector of the cord set.
Figure 37:
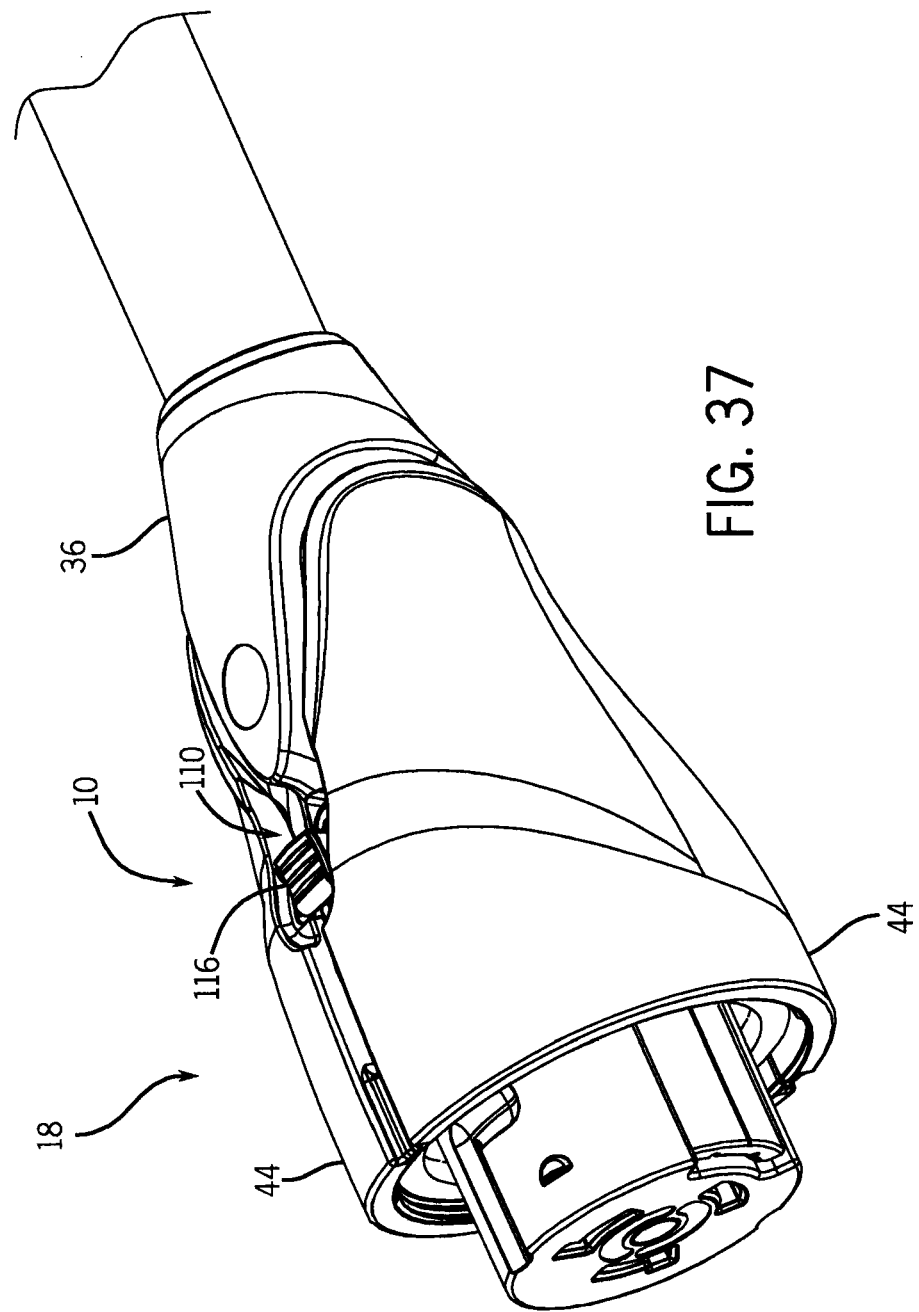
FIG. 37 is a perspective view of a third embodiment of the vehicle connector of the cord set of the present invention.
Figure 38:
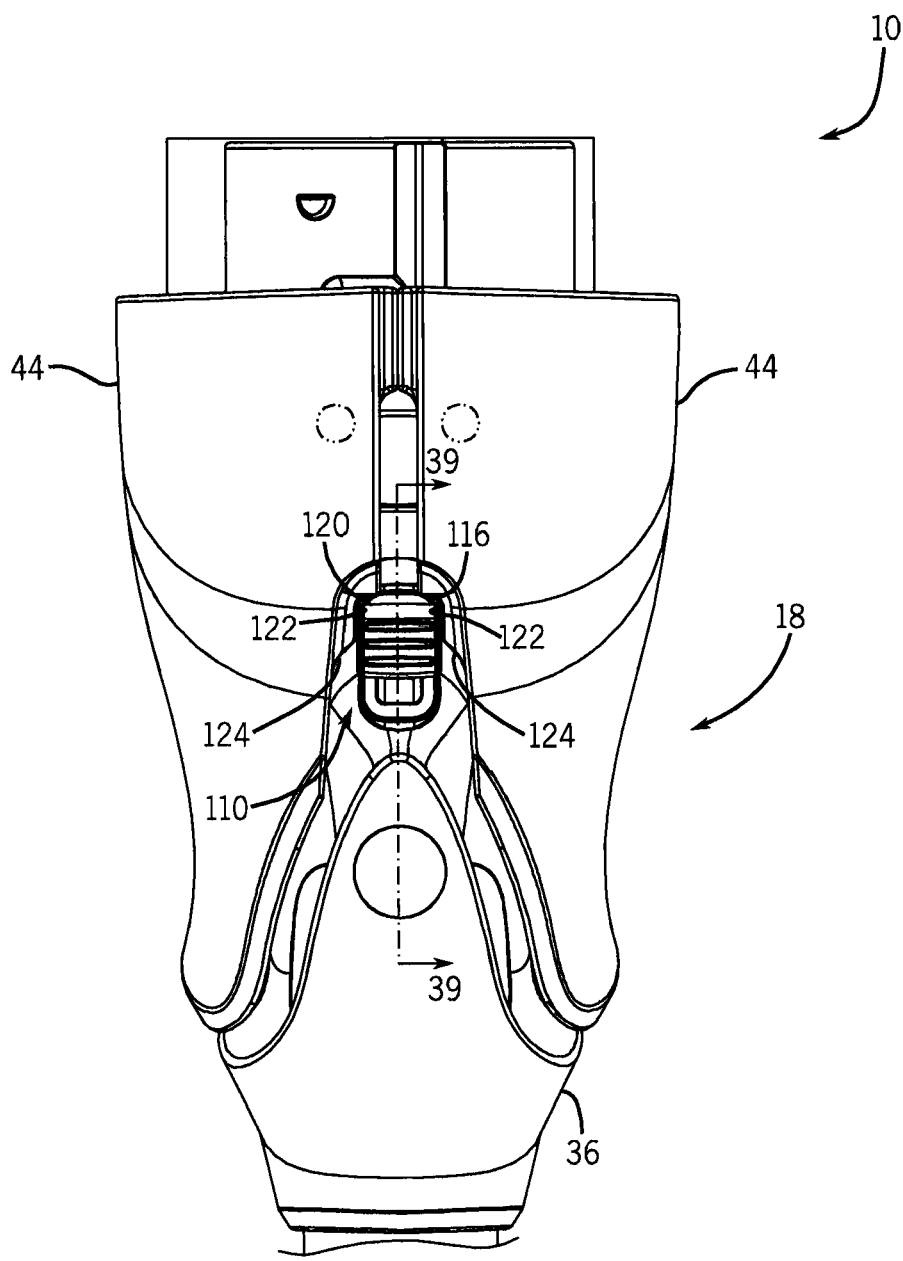
FIG. 38 is a partial top view of the cord set of FIG. 37 with a jaw lock in a closed position.
Figure 39:
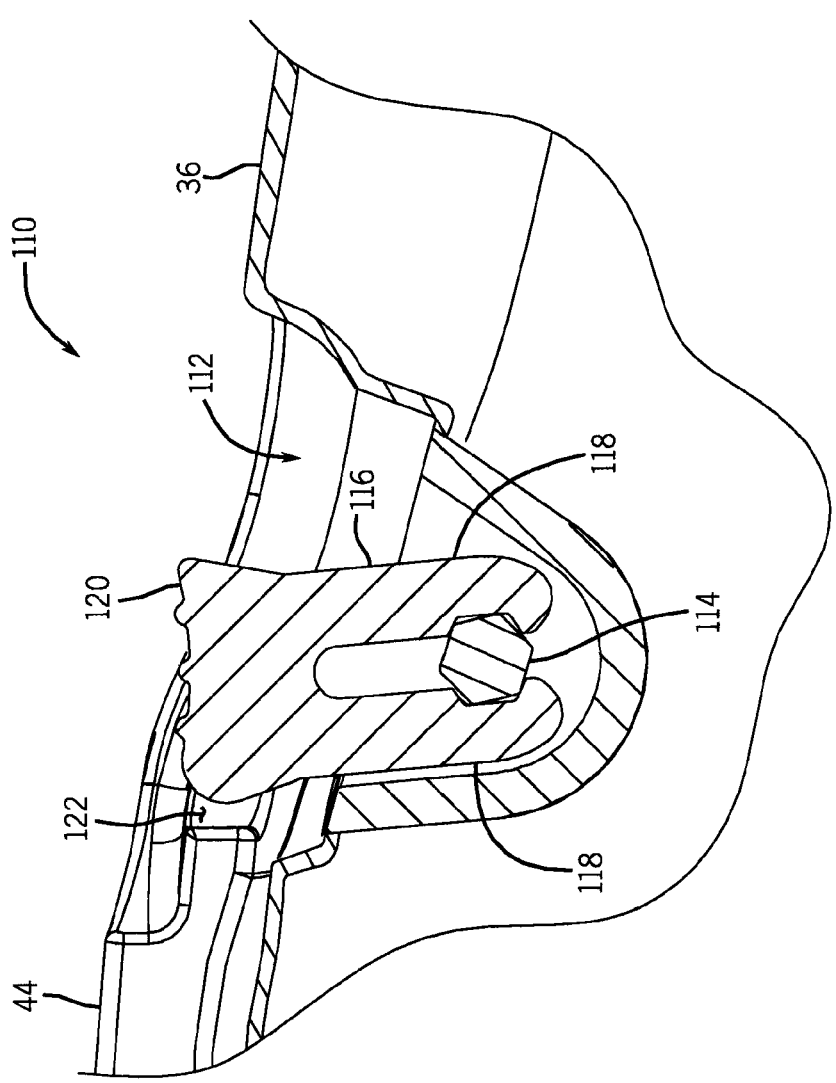
FIG. 39 is a section view of the vehicle connector along line 39-39 of FIG. 38.
Figure 40:
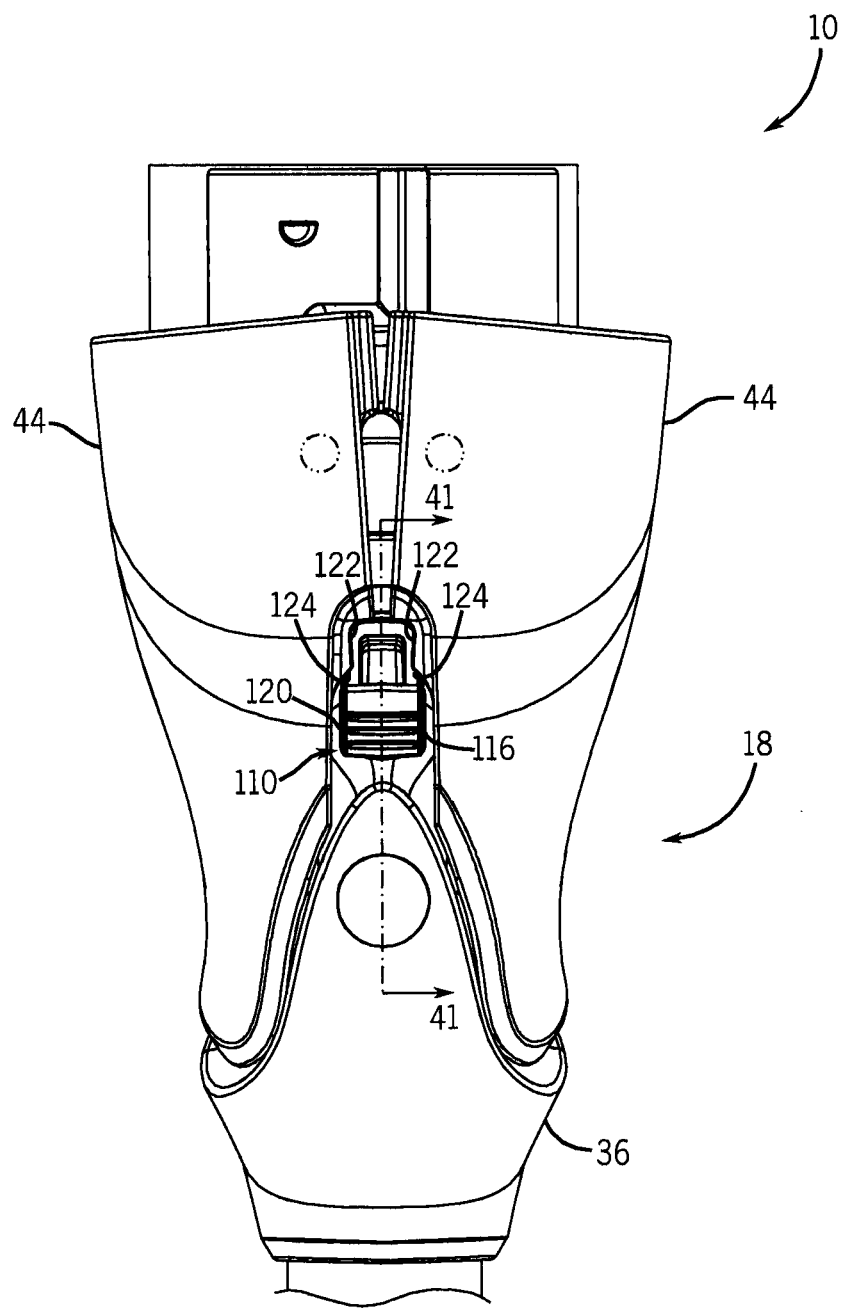
FIG. 40 is a partial top view of the cord set of FIG. 37 with the jaw lock and the jaws in an open position.
Figure 41:
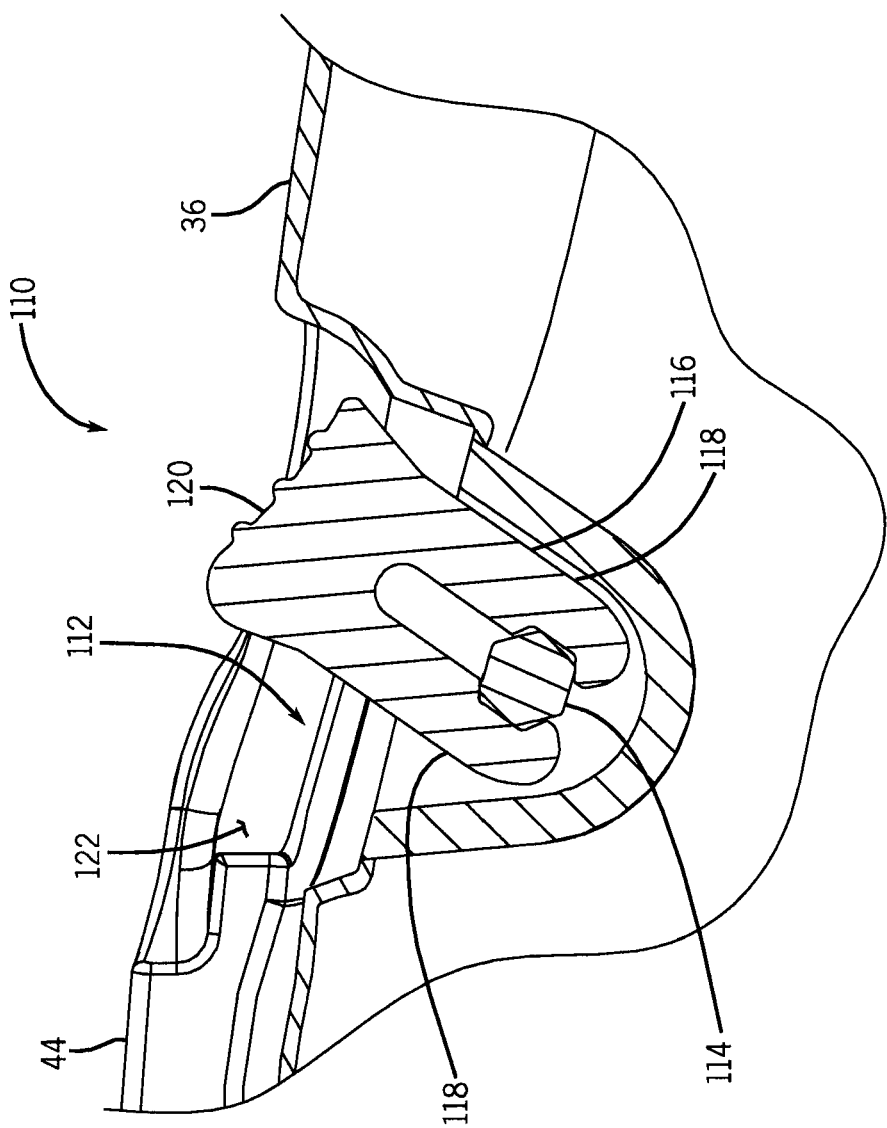
FIG. 41 is a section view of the vehicle connector along line 41-41 of FIG. 40.

Referring now to FIGS. 24-36, the cord set 10 is preferably manufactured as follows. Referring first to FIGS. 24 and 25, a base 90 of the housing 36 that includes the contact recesses 38 is provided with bosses 92 that ultimately pivotally support the connection jaws 44. The base 90 further includes bendable snap hooks 94 that are described in further detail below. Next and as shown in FIGS. 26 and 27, a contact housing 96 is engaged against the base 90 proximate the snap hooks 94. Referring to FIGS. 28 and 29, the electrical contacts 40 are next positioned such that they extend through openings in the contact housing 96 and into the base 90. In addition, the LED 76 is positioned within a recess 98 of the contact housing 96 that extends toward the distal face 72 of the base 90. Next and as shown in FIG. 30, an end cap 100 is then positioned over the contact housing 96. The end cap 100 includes snap supports 102 (i.e., eyelets) that each engage one of the snap hooks 94 of the base 90 to secure the contact housing 96 and the electrical contacts 40 relative to the base 90. Referring to FIGS. 31 and 32, the LED 82 and the sealing component 66 are next connected to the base 90. Furthermore, conductive wires 103 of the cord 14 are passed through openings 104 in the end cap 100 and connected to the electrical contacts 40. Next and referring to FIG. 33, the above components are positioned in a molding die (not shown) and overmolded with a material (e.g., a plastic resin) that forms an outer body 106 of the housing 36. Such an overmolding process firmly secures the cord 14 to the housing 36, although the mounting bosses 92 and the LED 82 remain exposed. Lastly and as shown in FIGS. 34-36, the connection jaws 44 are pivotally connected to the bosses 92 and the light guide 80 is positioned over the LED 82.

Referring now to FIGS. 37-41, a third embodiment of the shore power cord set 10 includes a vehicle connector 18 having a jaw locking mechanism 110. The jaw locking mechanism 110 is movable from a locked position (FIGS. 37-39) to an unlocked position (FIGS. 40 and 41) and vice versa. In the locked position, the jaw locking mechanism 110 contacts and holds the jaws 44 in the closed position as described above and shown, e.g., in FIGS. 1, 5, and 7. In the unlocked position, the jaw locking mechanism 110 disengages the jaws 44 to permit the jaws 44 to pivot to the open position as described above and shown, e.g., in FIGS. 6 and 8.

To achieve this functionality, the jaw locking mechanism 110 includes a recess 112 (FIGS. 39 and 41) within the vehicle connector housing 36. The recess 112 accommodates a stationary indexing shaft 114 (e.g., a hexagonal cross-sectional shaft, although other shapes could be used), and the shaft 114 pivotably supports a lock member 116. The lock member 116 includes spaced apart and flexible fingers 118 that engage opposite sides of the shaft 114.

In the locked position (FIG. 39), the fingers 118 engage two surfaces of the shaft 114. In the unlocked position (FIG. 41), the fingers 118 engage two different surfaces of the shaft 114. In addition, the hexagonal shape of the shaft 114 causes the fingers 118 to move slightly apart when moving between the locked and unlocked positions. However, the fingers 118 have a tendency to remain relatively close to each other, so the hexagonal shape of the shaft 114 and the flexibility of the fingers 118 bias the lock member 116 away from positions between the locked position and the unlocked position. Instead, the lock member 116 is biased toward the closer of the locked and the unlocked position.

Above the fingers 118, the lock member 116 includes a user-engageable member 120 that is pivotable to move the lock member 116 from the locked position to the unlocked position and vice versa. As shown most clearly in FIG. 38, in the locked position the sides of the user-engageable member 120 engage locking surfaces 122 of the jaws 44. This inhibits the jaws 44 from pivoting to the open position. Conversely and as shown most clearly in FIG. 40, in the unlocked position the sides of the user-engageable member 120 disengage the jaws 44. This permits the jaws 44 to pivot to the open position.

In addition to the biasing springs 56 described above, the jaws 44 also include angled guide surfaces 124 adjacent the locking surfaces 112 that facilitate moving the jaws 44 to the closed position. That is, if the locking member 16 is moved from the unlocked position to the locked position when the jaws 44 are in the open position, the user-engageable member 120 contacts the guide surfaces 124 to force the jaws 44 to pivot to the closed position.

The shore power cord set 10 described above may differ from the above description in various manners. For example, if the power supply's voltage is above the normal operating range, the first light 30 may be continuously illuminated in red and the second and third lights 32 and 34 may flash red. If the power supply's voltage is below the normal operating range, the first light 30 may be continuously illuminated in red and the second and third lights 32 and 34 are not illuminated. If the polarity of the power supply is reversed, the second light 32 may be continuously illuminated in red and the first and third lights 30 and 34 are not illuminated. If the power supply is not grounded, the third light 34 may be continuously illuminated in red and the first and second lights 30 and 32 are not illuminated. If none of the above errors are present, the first, second, and third lights 30, 32, and 34 may be continuously illuminated in green. If none of the above errors are present and the test button 26 is pressed, the first light 30 flashes green and the second and third lights 32, 34 are continuously illuminated in green. The lights 30, 32, and 34 may also illuminate (or not illuminate) in other manners to indicate the above conditions.

Figure 42:
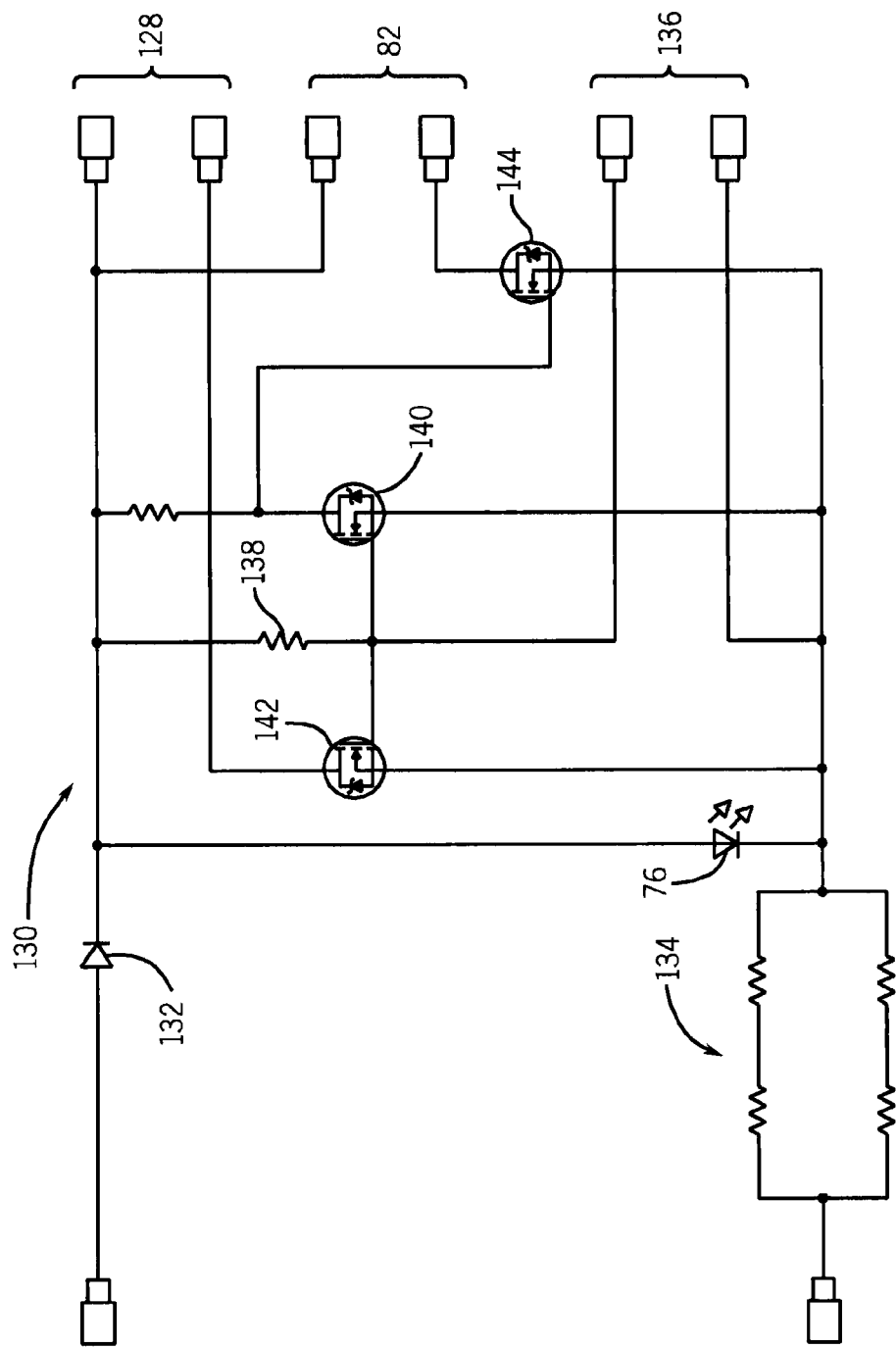
FIG. 42 is an electrical schematic of a corrosion-indicating circuit of a shore power cord set of the present invention.
Figures 43, 44:
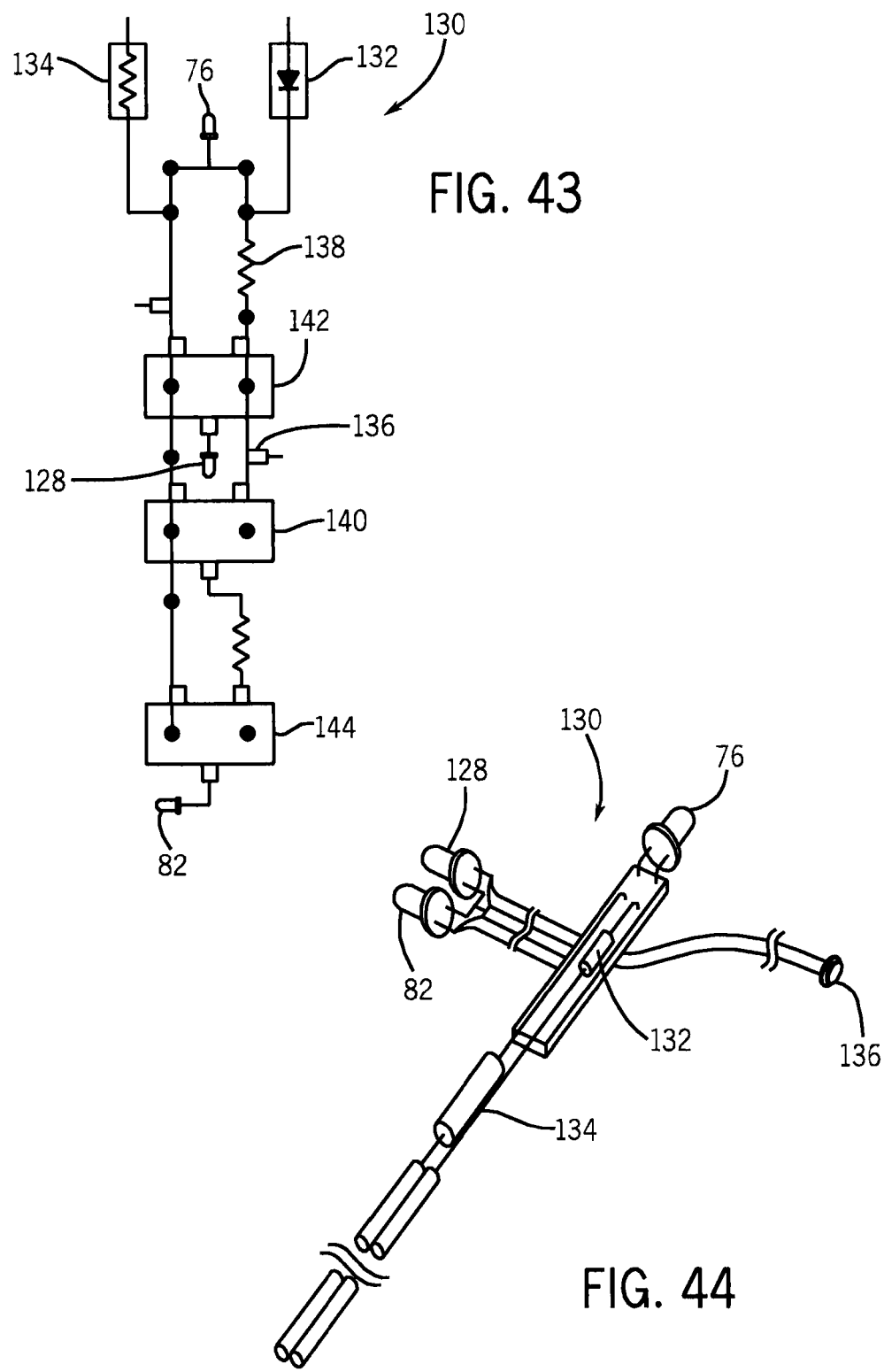
FIG. 43 is a component layout of the corrosion-indicating circuit of FIG. 42.
FIG. 44 is another component layout of the corrosion-indicating circuit of FIG. 42.

Referring now to FIGS. 42-44, the LEDs 76, 82, and 128 (the LED may be disposed in the recess proximate the LED 82) may also form part of a corrosion-indicating module or circuit 130 housed within the shore power cord set 10. In general, the circuit 130 normally causes the LED 82 to illuminate in a first color (e.g., blue) if power is available and a second color (e.g., red) if the vehicle connector 18 or the power supply connector 12 has sufficiently corroded to raise the temperature of the vehicle connector 18 above a threshold.

Referring particularly to FIG. 42, an input voltage $V_{input}$ (e.g., 115V AC) is connected to a diode 132 having a forward voltage $V_{132}$ (e.g., 0.7V) and a resistor 134 having a resistance $R_{134}$ (e.g., 4.7 kΩ). The resistor 134 acts as a current-limiting resistor providing a current I to the circuit 130. In this case:

$$I=(V_{input}-V_{132}-V_{76})/R_{134}$$

In the present example, if $V_{76}$ is 3.2V, then I is 24 mA. In the circuit 130, the diode 132 provides voltage polarity and the LED 76 establishes, e.g., a 3.2V limit (i.e., the LED 76 acts as a Zener diode) to the pulsed DC supply. No filtering is provided for the DC cycle pulses created from $V_{input}$.

The circuit 130 also includes a temperature sensor 136 having a resistance $T_{136}$ that varies with temperature. The temperature sensor 136 is preferably a thermistor rated for $R_1$ at $T_1$ and $R_2$ at $T_2$ (e.g., 470Ω at 25 degrees Celsius and 4700Ω at 85 degrees Celsius), such as a PRF18BE471RB1RB thermistor available from Murata Manufacturing Co. of Kyoto, Japan.

When operating normally, the temperature sensor 136 is at $T_1$ and has a resistance $R_1$. The resistive divider of temperature sensor 136 and a resistor 138 having a resistance $R_{138}$ (e.g., 22 kΩ) provides a voltage $V_1$ to the gate of a transistor 140, which is given by:

$$V_1=(R_1/(R_{138}+R_1))^*V_{76}$$

In the present example, $V_1$ is 0.07V. In this state, the transistor 140 is off, a transistor 142 connected in series to the LED 128 (i.e., the red LED) is off, and a transistor 144 connected in series to the LED 82 (i.e., the blue LED) is on. As such, the LEDs 82 and 76 (i.e., the flashlight LED) are on and the LED 128 is off.

As the temperature sensor 136 warms, its resistance increases. The transistor 140 turns on in a range of $V_2$ to $V_3$ (e.g., 0.8V to 3.0V) at its gate. The temperature sensor 136 must achieve a minimum resistance $R_{min}$ (e.g., 7.33 kΩ) to provide $V_2$ to the gate of the transistor 140. The temperature sensor 136 achieves $R_{min}$, e.g., at about 82 degrees Celsius to 90 degrees Celsius and provides a voltage in the range of 0.8V to 3.0V over a range of about 82 degrees Celsius to 117 degrees Celsius.

When the transistor 140 turns on, the transistor 142 turns on and the transistor 144 turns off. In this state, the LED 82 (i.e., the blue LED) is off and the LED 128 (i.e., the red LED) is on. When the LED 128 turns on, its forward voltage $V_{128}$ is less than $V_{76}$ (e.g., 2.1V compared to 3.2V), so the LED 76 dims. This reduces the voltage on the transistor 140 slightly and would result in a reduction of its gate voltage causing oscillation in very slow thermal transitions (i.e., additional warning). During rapid upward transitions, this state would not be observed as the temperature sensor 136 would transition past the transistor 140 gate threshold voltage too quickly.

As the temperature sensor 136 cools, its resistance decreases. When below the range of $V_2$ to $V_3$ on the gate of the transistor 140, it will turn off. In this state, the transistor 142 is off, the transistor 144 is on, the LED 82 (i.e., the blue LED) is on, the LED 128 (i.e., the red LED) is off, and the LED 76 (i.e., the flashlight LED) is on to indicate normal operating conditions.

The corrosion-indicating circuit 130 advantageously operates as if in a filtered DC environment, and its parasitic LED responses use differences in forward voltage to create a dimming effect. Furthermore, using the LED 76 acts as a zener diode to regulate the supplied voltage and alleviate the need for several other power supply components. The circuit 130 is indifferent to the different points of the AC cycle and it scales all inputs together and compares them at, e.g., the 3.2V peak for operation. The 30 Hz flash of the circuit is essentially invisible to the eye appearing only as flicker. The circuit operates with flicker at all times so does not need any filtering of its power supply.

Even further still, the use of the LED 128 to shunt out the LED 76 by forward voltage allows the circuit to dim the LED 76 with no added circuitry. The LED 82 preferably has the same forward voltage as the LED 76, which permits both LEDs to be on brightly without the need for a separate resistor for each. The resistance value of the resistor 134 also preferably alleviates the need for additional current limiting to operate the transistors and LEDs.

The corrosion-indicating circuit 130 advantageously includes only three transistors and two resistors in the switching circuit and one diode and one resistor in the power supply circuit. Moreover, three LEDs are controlled by a single thermistor.

Although a comparator circuit could increase accuracy of temperature indication, the nearly exponential nature of the temperature sensor's resistance change with temperature allows even the relatively large threshold range of the transistors (e.g., 0.8V to 3.0V) to indicate a relatively narrow sensed temperature range. Other devices in the family of the above-listed thermistor have 4.7 k$\Omega$ at temperatures of 85 degrees Celsius to 115 degrees Celsius, so many other threshold ranges could also be indicated.

Thus, the invention provides an electrical cord set for electrically connecting a power supply to a vehicle, including:

a power supply connector including a plurality of electrical contacts configured to engage and thereby electrically connect the power supply to the power supply connector;

a vehicle connector including a plurality of electrical contacts configured to engage and thereby electrically connect the vehicle to the vehicle connector; and a test module electrically connecting the power supply connector and the vehicle connector, the test module having an electrical circuit, and when the power supply connector is connected to the power supply the electrical circuit tests a voltage of the power supply and provides an indication if the voltage is outside of a normal operating range. The test module may also include a first light providing the indication if the voltage is outside of the normal operating range.

Alternatively or in addition to the voltage testing described above, the test module could have an electrical circuit configured to test a polarity of the power supply when the power supply connector is connected to the power supply and provide an indication if the polarity of the power supply is reversed. With this alternative, the test module could include a light that is illuminated to provide the indication if the polarity of the power supply is reversed.

In another alternative or in addition to the above features in any combination, the test module may have an electrical circuit that tests for grounding of the power supply and provides an indication if grounding is not present. With this feature, the test module may include a light that is illuminated to provide the indication if grounding is not present.

In addition, in any combination, the circuit might include circuitry to test for current leakage and providing an indication if current leakage is present.

In addition, the invention provides an electrical cord set for electrically connecting a power supply to a vehicle that has a flashlight. The flashlight may be, for example, a light-emitting diode. The flashlight may be disposed at a distal face of the vehicle connector housing such that light from the flashlight is emitted at the distal face. The distal face of the housing may have at least three openings to the recesses in the housing where the electrical contacts are, and the flashlight is disposed between the openings. Alternatively, the flashlight may have an annular shape that circumscribes the openings or may define the entire distal face of the vehicle connector housing.

In another aspect, the vehicle connector of the cord set has at least two connection jaws, each of the connection jaws being pivotally connected to the housing to move between a closed position and an open position. In the closed position, the jaws are engagable with the vehicle power receptacle to secure the vehicle connector to the vehicle power receptacle, and in the open position the jaws are disengagable with the vehicle power receptacle. The connection jaws may be biased towards the closed position and may be pivotable about axes that are not parallel to the longitudinal axis and may be perpendicular to the longitudinal axis. The vehicle connector may include a sealing component configured to engage the vehicle power receptacle to isolate the plurality of electrical contacts of the vehicle connector from an outside environment and the connection jaws may define a recess in which the sealing component is disposed.

In this aspect, the housing may further have a base and an end cap snap connected to the base. Each of the connection jaws may include a threaded internal surface configured to engage an external threaded surface of the power receptacle. Each internal threaded surface may have a first nominal diameter and a first pitch, the external threaded surface may have a second nominal diameter and a second pitch, and the second nominal diameter and the second pitch may be substantially the same as the first nominal diameter and the first pitch, respectively. Each internal threaded surface may have a nominal diameter of substantially 2-¾ inches and a pitch of substantially 16 threads per inch.

In addition to having pivotally connected jaws, the vehicle connector may have a lock member that is movable from a locked position to an unlock position and vice versa. In the locked position, the lock member engages the connection jaws to inhibit the connection jaws from moving to the open position. The lock member disengages the connection jaws in the unlocked position to permit the connection jaws to move to the open position. The housing may define a recess housing a shaft, and the shaft supports the lock member such that the lock member is pivotable from the locked position to the unlocked position and vice versa. The shaft may have a hexagonal cross-sectional shape and the locking member may include flexible fingers engaging opposite sides of the shaft thereby biasing the locking member toward the locked position and the unlock position. The jaws may be pivotable about axes disposed between the plurality of electrical contacts supported by the housing and the lock member.

In addition, in any combination, the vehicle or power supply connector may include a corrosion-indicating module configured to indicate corrosion of at least one of the power supply connector and the vehicle connector. The corrosion-indicating module may include a first light and a second light, the corrosion-indicating module illuminating the first light under normal operating conditions and the second light to indicate corrosion of the at least one of the power supply connector and the vehicle connector, and the lights may be of different colors. The corrosion-indicating module may include a thermistor having a temperature-dependent resistance, the corrosion-indicating module illuminating the second light when the resistance of the thermistor exceeds a threshold. The corrosion-indicating circuit may include a third light, the corrosion-indicating circuit illuminating in a first intensity under normal operating conditions and a second intensity less than the first intensity to indicate corrosion of the connector to which it is applied. The first light may be a light-emitting diode having first forward voltage, the third light may be a light-emitting diode having a second forward voltage, and the second forward voltage may be substantially equal to the first forward voltage. The third light may be a light-emitting diode that acts as a Zener diode to establish a voltage limit in the corrosion-indicating module.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. An electrical cord set for electrically connecting a power supply to a vehicle, comprising:
    a power supply connector including a plurality of electrical contacts configured to engage and thereby electrically connect the power supply to the power supply connector;
    a vehicle connector including a plurality of electrical contacts configured to engage and thereby electrically connect the vehicle to the vehicle connector;
    a test module electrically connecting the power supply connector and the vehicle connector, the test module having an electrical circuit, and when the power supply connector is connected to the power supply the electrical circuit performs at least one of the tests selected from the following group:
        tests a voltage of the power supply and provides an indication if the voltage is outside of a normal operating range;
        tests a polarity of the power supply and provides an indication if the polarity of the power supply is reversed; and
        tests for grounding of the power supply and provides an indication if grounding is not present,
    wherein the vehicle connector includes:
    a housing supporting a plurality of electrical contacts configured to engage and thereby electrically connect the vehicle power receptacle to the vehicle connector;
    at least two connection jaws, each of the connection jaws being pivotally connected to the housing to move between a closed position and an open position, in the closed position the jaws being engagable with the vehicle power receptacle to secure the vehicle connector to the vehicle power receptacle, and in the open position the jaws being disengagable with the vehicle power receptacle, wherein each of the connection jaws includes a ribbed internal surface configured to engage an external threaded surface of a power receptacle.

2. The electrical cord set of claim 1, wherein the connection jaws are biased towards the closed position.

3. The electrical cord set of claim 1, wherein the flexible electrical cord defines a longitudinal axis of the electrical cord set, and the connection jaws are pivotable about axes that are perpendicular to the longitudinal axis.

4. The electrical cord set of claim 1, wherein the vehicle connector includes a sealing component configured to engage the vehicle power receptacle to isolate the plurality of electrical contacts of the vehicle connector from an outside environment.

5. The electrical cord set of claim 1, further comprising a lock member being movable from a locked position to an unlock position and vice versa, in the locked position the lock member engaging the connection jaws to inhibit the connection jaws from moving to the open position.

6. An electrical cord set for electrically connecting a power supply to a vehicle, comprising:
    a power supply connector including a plurality of electrical contacts configured to engage and thereby electrically connect the power supply to the power supply connector;
    a vehicle connector including a plurality of electrical contacts configured to engage and thereby electrically connect the vehicle to the vehicle connector;
    a corrosion-indicating module configured to indicate corrosion of at least one of the power supply connector and the vehicle connector;
    a test module electrically connecting the power supply connector and the vehicle connector, the test module having an electrical circuit, and when the power supply connector is connected to the power supply the electrical circuit performs at least one of the tests selected from the following group:
        tests a voltage of the power supply and provides an indication if the voltage is outside of a normal operating range;
        tests a polarity of the power supply and provides an indication if the polarity of the power supply is reversed; and
        tests for grounding of the power supply and provides an indication if grounding is not present.

7. The electrical cord set of claim 6, wherein the corrosion-indicating module includes a thermistor having a temperature-dependent resistance, the corrosion-indicating module providing an indication when the resistance of the thermistor exceeds a threshold.

8. An electrical cord set for electrically connecting a power supply to a vehicle, comprising:
    a power supply connector including a plurality of electrical contacts configured to engage and thereby electrically connect the power supply to the power supply connector;
    a vehicle connector including a plurality of electrical contacts configured to engage and thereby electrically connect the vehicle to the vehicle connector;
    a test module electrically connecting the power supply connector and the vehicle connector, the test module having an electrical circuit, and when the power supply connector is connected to the power supply the electrical circuit performs the steps of:
        testing for current leakage and providing an indication if current leakage is present;

testing a voltage of the power supply and providing an indication if the voltage is outside of a normal operating range;
testing a polarity of the power supply and providing an indication if the polarity of the power supply is reversed; and
testing for grounding of the power supply and providing an indication if grounding is not present.

9. The electrical cord set of claim 8, wherein the test module further comprises:
a first light that is illuminated to provide the indication if the voltage is outside of the normal operating range;
a second light that is illuminated to provide the indication if the polarity of the power supply is reversed; and
a third light that is illuminated to provide the indication if grounding is not present.

10. An electrical cord set for electrically connecting a power supply to a vehicle power receptacle, comprising:
a power supply connector including a plurality of electrical contacts configured to engage and thereby electrically connect the power supply to the power supply connector;
a flexible electrical cord electrically connected to the power supply connector;
a vehicle connector electrically connected to the flexible electrical cord, the vehicle connector including:
a housing supporting a plurality of electrical contacts configured to engage and thereby electrically connect the vehicle power receptacle to the vehicle connector;
at least two connection jaws, each of the connection jaws being pivotally connected to the housing to move between a closed position and an open position, in the closed position the jaws being engagable with the vehicle power receptacle to secure the vehicle connector to the vehicle power receptacle, and in the open position the jaws being disengagable with the vehicle power receptacle, and wherein the connection jaws are biased towards the closed position and include a ribbed internal surface configured to engage an external threaded surface of a power receptacle.

11. The electrical cord set of claim 10, wherein the connection jaws are pivotable about axes that are perpendicular to the longitudinal axis.

12. An electrical cord set for electrically connecting a power supply to a vehicle power receptacle, comprising:
a power supply connector including a plurality of electrical contacts configured to engage and thereby electrically connect the power supply to the power supply connector;
a flexible electrical cord electrically connected to the power supply connector;
a vehicle connector electrically connected to the flexible electrical cord, the vehicle connector including:
a housing supporting a plurality of electrical contacts configured to engage and thereby electrically connect the vehicle power receptacle to the vehicle connector;
at least two connection jaws, each of the connection jaws being pivotally connected to the housing to move between a closed position and an open position, in the closed position the jaws being engagable with the vehicle power receptacle to secure the vehicle connector to the vehicle power receptacle, and in the open position the jaws being disengagable with the vehicle power receptacle, and
a lock member being movable from a locked position to an unlock position and vice versa, in the locked position the lock member engaging the connection jaws to inhibit the connection jaws from moving to the open position.

13. The electrical cord set of claim 10, wherein the vehicle connector includes a sealing component configured to engage the vehicle power receptacle to isolate the plurality of electrical contacts of the vehicle connector from an outside environment.

14. The electrical cord set of claim 8, wherein the vehicle connector includes a flashlight illuminated by the power supply.

15. The electrical cord set of claim 14, wherein the flashlight is a light-emitting diode.

\* \* \* \* \*